United States Patent
Na et al.

(10) Patent No.: US 11,890,949 B2
(45) Date of Patent: Feb. 6, 2024

(54) COMMUNICATION SYSTEM

(71) Applicants: DENSO CORPORATION, Kariya (JP); TOYOTA JIDOSHA KABUSHIKI KAISHA, Toyota (JP); MIRISE Technologies Corporation, Nisshin (JP)

(72) Inventors: Hyoungjun Na, Nisshin (JP); Yoshikazu Furuta, Nisshin (JP); Shigeki Otsuka, Nisshin (JP); Takasuke Ito, Nisshin (JP); Tomohiro Nezuka, Nisshin (JP)

(73) Assignees: DENSO CORPORATION, Kariya (JP); TOYOTA JIDOSHA KABUSHIKI KAISHA, Toyota (JP); MIRISE Technologies Corporation, Nisshin (JP)

(*) Notice: Subject to any disclaimer, the term of this patent is extended or adjusted under 35 U.S.C. 154(b) by 121 days.

(21) Appl. No.: 17/722,444

(22) Filed: Apr. 18, 2022

(65) Prior Publication Data

US 2022/0340011 A1    Oct. 27, 2022

(30) Foreign Application Priority Data

Apr. 23, 2021   (JP) ................... 2021-073374

(51) Int. Cl.
  *B60L 3/00*      (2019.01)
  *H01M 10/42*    (2006.01)
  *G06F 13/42*     (2006.01)

(52) U.S. Cl.
  CPC ........... *B60L 3/0084* (2013.01); *B60L 3/0092* (2013.01); *G06F 13/4247* (2013.01); *H01M 10/425* (2013.01); *H01M 2010/4271* (2013.01)

(58) Field of Classification Search
  CPC .. B60L 3/0084; B60L 3/0092; B60L 2220/44; B60L 2240/80; G06F 13/4247;
  (Continued)

(56) References Cited

U.S. PATENT DOCUMENTS 5,737,199 A * 4/1998 Kanamori .............. H02H 7/122
                                                          361/23
6,124,628 A * 9/2000 Fujihira ................ H01L 29/404
                                                          257/E29.268
(Continued)

FOREIGN PATENT DOCUMENTS

JP    2006-166544 A    6/2006
JP    2006-268254 A    10/2006
(Continued)

*Primary Examiner* — Jared Fureman
*Assistant Examiner* — Michael J Warmflash
(74) *Attorney, Agent, or Firm* — POSZ LAW GROUP, PLC

(57) ABSTRACT

In a communication system, a control unit and driver units are connected in a daisy chain; each unit includes a corresponding insulated communication circuit, respectively. The control unit measures a communication delay time between the control unit and each driver unit from a response time to transmission of a pulse signal performed to each driver unit during a measurement period. Then, based on each communication delay time, the control unit transmits a shift time to each driver unit for equalizing the timing of signals output by the driver units. When each driver unit receives, from the control unit, an instruction instructing each driver unit to output a signal, each driver unit outputs the signal when the shift time has elapsed.

9 Claims, 28 Drawing Sheets

(58) Field of Classification Search
CPC ....... H01M 10/425; H01M 2010/4271; H01M 10/48; H01M 2220/20; Y02T 10/72; B60R 16/0231; B60K 7/0007; H02P 21/14; H02P 27/085; H04L 12/44
See application file for complete search history.

(56) References Cited

U.S. PATENT DOCUMENTS

| | | | |
|---|---|---|---|
| 6,323,539 B1* | 11/2001 | Fujihira | H01L 29/8611 257/E29.268 |
| 9,073,424 B2* | 7/2015 | Vogler | B60B 3/16 |
| 9,436,261 B2* | 9/2016 | Yun | H02J 7/00047 |
| 2011/0215810 A1* | 9/2011 | Murakami | G01R 31/371 324/426 |
| 2016/0054393 A1* | 2/2016 | Hase | G01R 31/396 324/434 |

FOREIGN PATENT DOCUMENTS

| | | |
|---|---|---|
| JP | 2009-207235 A | 9/2008 |
| JP | 2017-112697 A | 6/2017 |

* cited by examiner

FIG. 10

| | BIDIRECT COMM DELAY FROM IC0 | DELAY TIME | DIFFERENCE FROM LONGEST |
|---|---|---|---|
| IC1 | 20 μs | 10 μs | 15 μs |
| IC2 | 26 μs | 13 μs | 12 μs |
| IC3 | 32 μs | 16 μs | 9 μs |
| IC4 | 38 μs | 19 μs | 6 μs |
| IC5 | 44 μs | 22 μs | 3 μs |
| IC6 | 50 μs | 25 μs | — |

FIG. 18

| | BIDIRECT COMM DELAY FROM IC0 | DELAY TIME | DIFFERENCE FROM LONGEST |
|---|---|---|---|
| IC1 | 22.0 μs | 11.0 μs | 16.5 μs |
| IC2 | 28.6 μs | 14.3 μs | 13.2 μs |
| IC3 | 35.2 μs | 17.6 μs | 9.9 μs |
| IC4 | 41.8 μs | 20.9 μs | 6.6 μs |
| IC5 | 48.4 μs | 24.2 μs | 3.3 μs |
| IC6 | 55.0 μs | 27.5 μs | — |

COMMUNICATION SYSTEM

CROSS REFERENCE TO RELATED APPLICATION

The present application is based on Japanese Patent Application No. 2021-073374 filed on Apr. 23, 2021, the disclosure of which is incorporated herein by reference.

TECHNICAL FIELD

The present disclosure relates to a system where communication devices, which include a master and a plurality of slaves, communicate with each other in a daisy chain.

BACKGROUND

For example, there is proposed a first technology of a so-called in-wheel motor in which a motor, which is a drive source of a vehicle in an electric vehicle, is arranged on an inner peripheral side of a wheel included in a traveling wheel. Further, there is disclosed a second technology of a motor provided with an inverter which is a driver circuit corresponding to each motor in order to independently control the motor arranged on each wheel. Further, there is disclosed a third technology of an inverter having an in-wheel structure together with a motor corresponding to the inverter.

SUMMARY

According to an example of the present disclosure, a communication system is provided with communication devices including a master and slaves that are connected in a daisy chain. Each of the master and the slaves includes a corresponding insulated communication circuit. The master measures a communication delay time between the master and each slave from a response time to transmission performed to each slave during a measurement period. Then, based on each communication delay time, the master transmits a shift time to each slave for equalizing the timing of signals output by the slaves. When each slave receives, from the master, an instruction instructing each slave to output of a signal, each slave outputs the signal when the shift time has elapsed.

BRIEF DESCRIPTION OF DRAWINGS

The objects, features, and advantages of the present disclosure will become more apparent from the following detailed description made with reference to the accompanying drawings. In the drawings:

FIG. 5 is a flowchart showing a system operation when the power is turned on;

FIG. 10 is a diagram showing an example of communication delay time of each IC;

FIG. 18 is a diagram showing an example of a correction result of a total delay time;

DETAILED DESCRIPTION

First Embodiment

Figure 3:
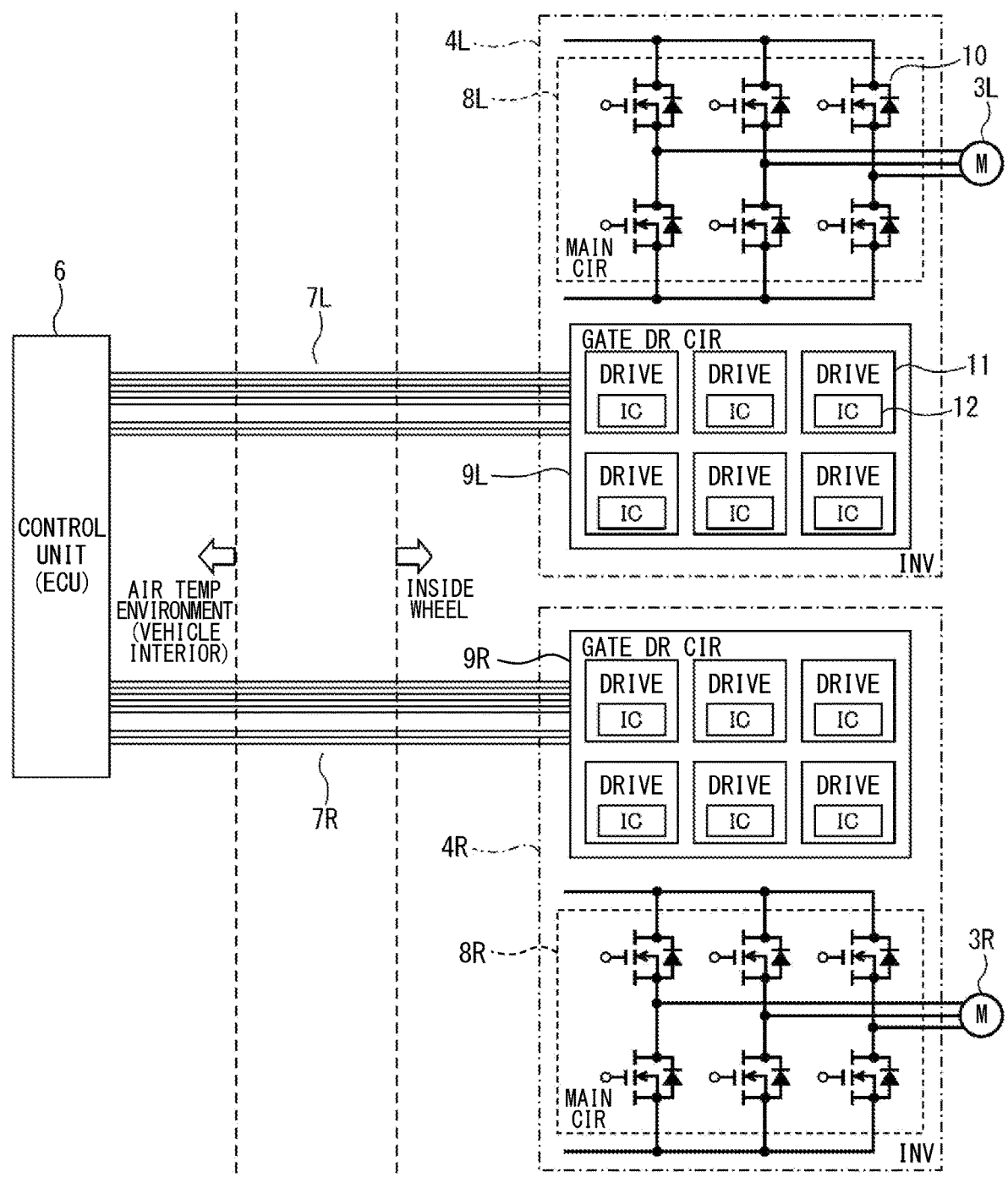
FIG. 3 is a functional block diagram showing a system configuration shown in FIG. 4 in more detail.
Figure 4:
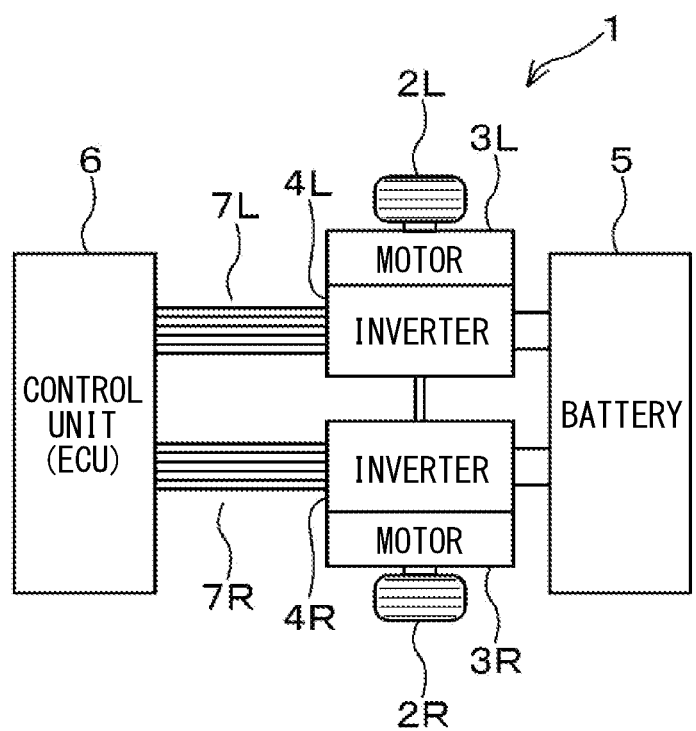
FIG. 4 is a functional block diagram schematically showing a system configuration in an electric vehicle.

As shown in FIG. 4, a communication system according to a first embodiment is applied to an electric vehicle in which (i) a motor and (ii) an inverter to drive the motor have an in-wheel structure (i.e., the motor and the inverter are arranged in a wheel). In FIG. 4, the motor and the inverter are shown to be outside the wheel 2L and 2R for convenience of illustration, but in reality, the motor and the inverter have an in-wheel structure as shown in FIG. 3.

A motor 3L and an inverter 4L are arranged to correspond to a wheel 2L of an electric vehicle 1. The inverter 4L drives the motor 3L. The rotation shaft of the motor 3L is attached to a wheel shaft of the wheel 2L. Similarly, the motor 3R and the inverter 4R are arranged to correspond to a wheel 2R. Drive power is supplied to the inverters 4L and 4R from a secondary battery 5 such as a lithium ion battery. A control unit 6 which is an ECU (Electronic Control Unit) outputs a drive control signal to the inverters 4L and 4R via cables 7L and 7R. If it is not necessary to distinguish between left and right in the description of the configuration described below, the reference signs are shown without "L", "R".

The inverter 4, which is an example of a power converter, includes a main circuit 8 and a gate driver circuit 9. The main circuit 8 is configured by connecting, for example, N-channel MOSFETs 10 which are switching elements to a three-phase bridge. The gate driver circuit 9 includes six driver units 11 respectively corresponding to the six FETs 10, and each driver unit 11 outputs a gate drive signal to the corresponding FET 10. Each driver unit 11 includes an IC 12 having a communication function.

Figure 1:
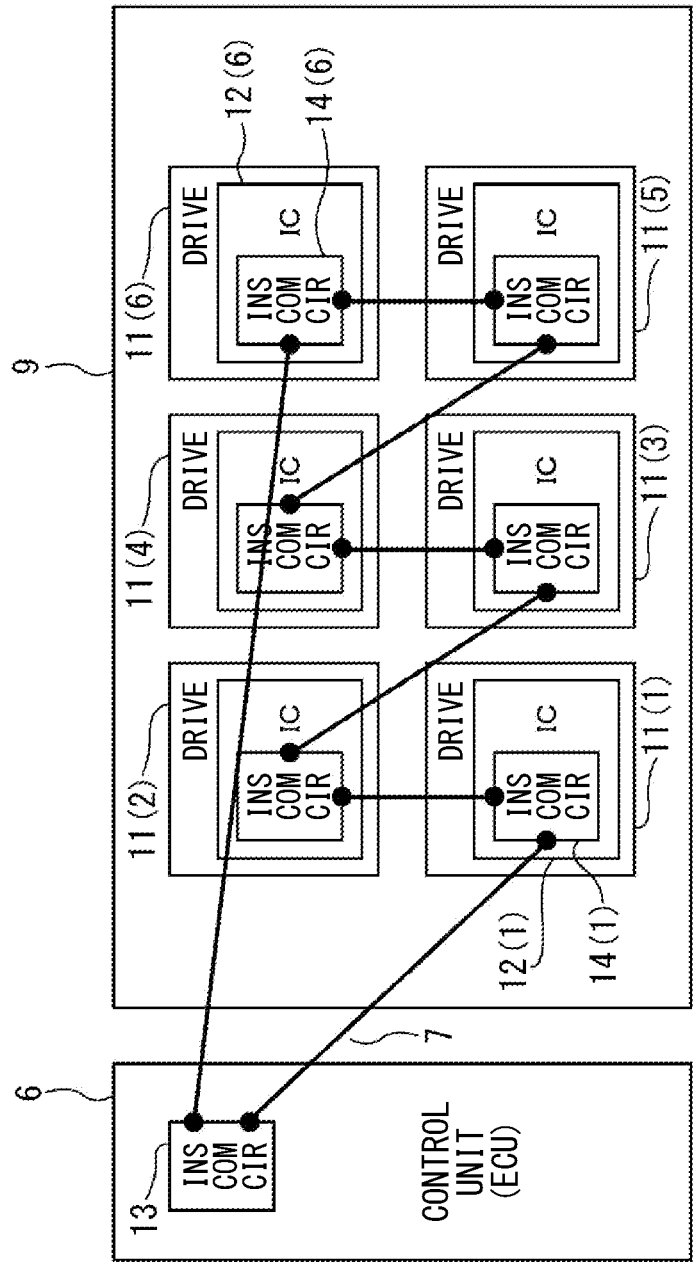
FIG. 1 is a diagram showing a configuration in which a control unit and each driver unit are connected in a daisy chain according to a first embodiment.
Figure 2:
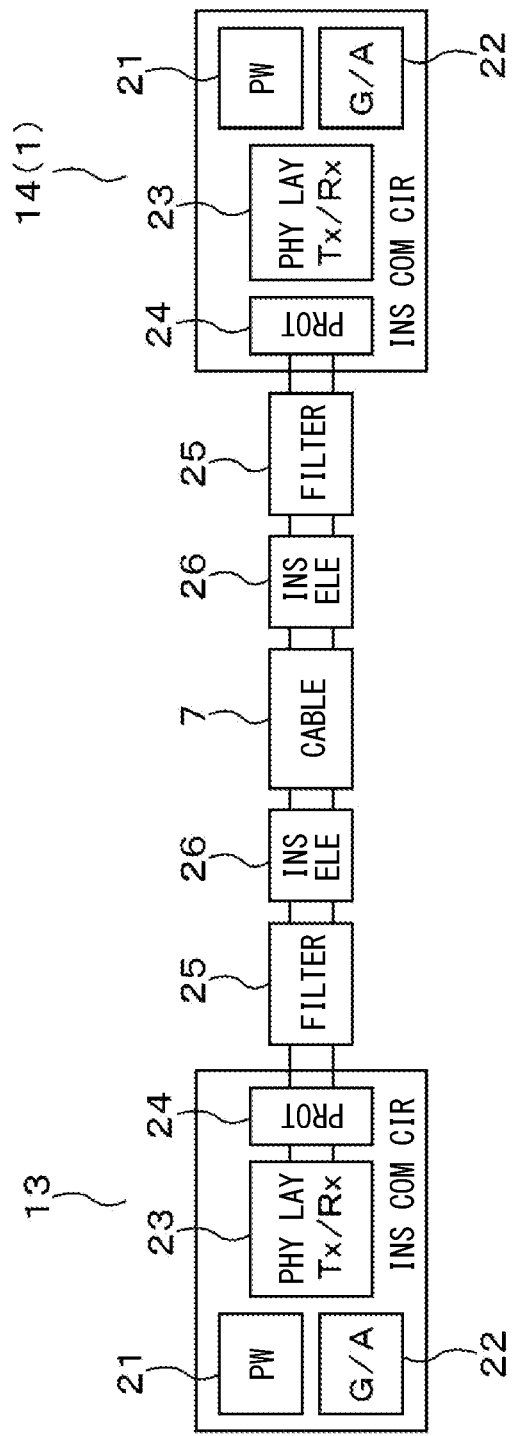
FIG. 2 shows a more detailed connection configuration between two insulated communication circuits.

As shown in FIG. 1, the control unit 6 includes an insulated communication circuit 13, and the IC 12 of each driver unit 11 also includes an insulated communication circuit 14. The insulated communication circuit 13 and the insulated communication circuits 14 (1) to 14 (6) are daisy-chained by a communication cable. FIG. 2 shows a more detailed connection configuration between the insulated communication circuit 13 and the insulated communication circuit 14 (1) as two insulated communication circuits.

The insulated communication circuits 13 and 14 each include a power supply 21, a gate array 22, a transmission/reception circuit 23, a protection circuit 24, a filter 25, and an insulating element 26. Then, the insulating elements 26 and 26 included in the insulated communication circuits 13 and 14 (1) are connected by a cable 7. The control unit 6 is an example of a master, and each driver unit 11 is an example of a slave. Further, the control unit 6 and each driver unit 11 are also examples of communication devices.

Figure 5:
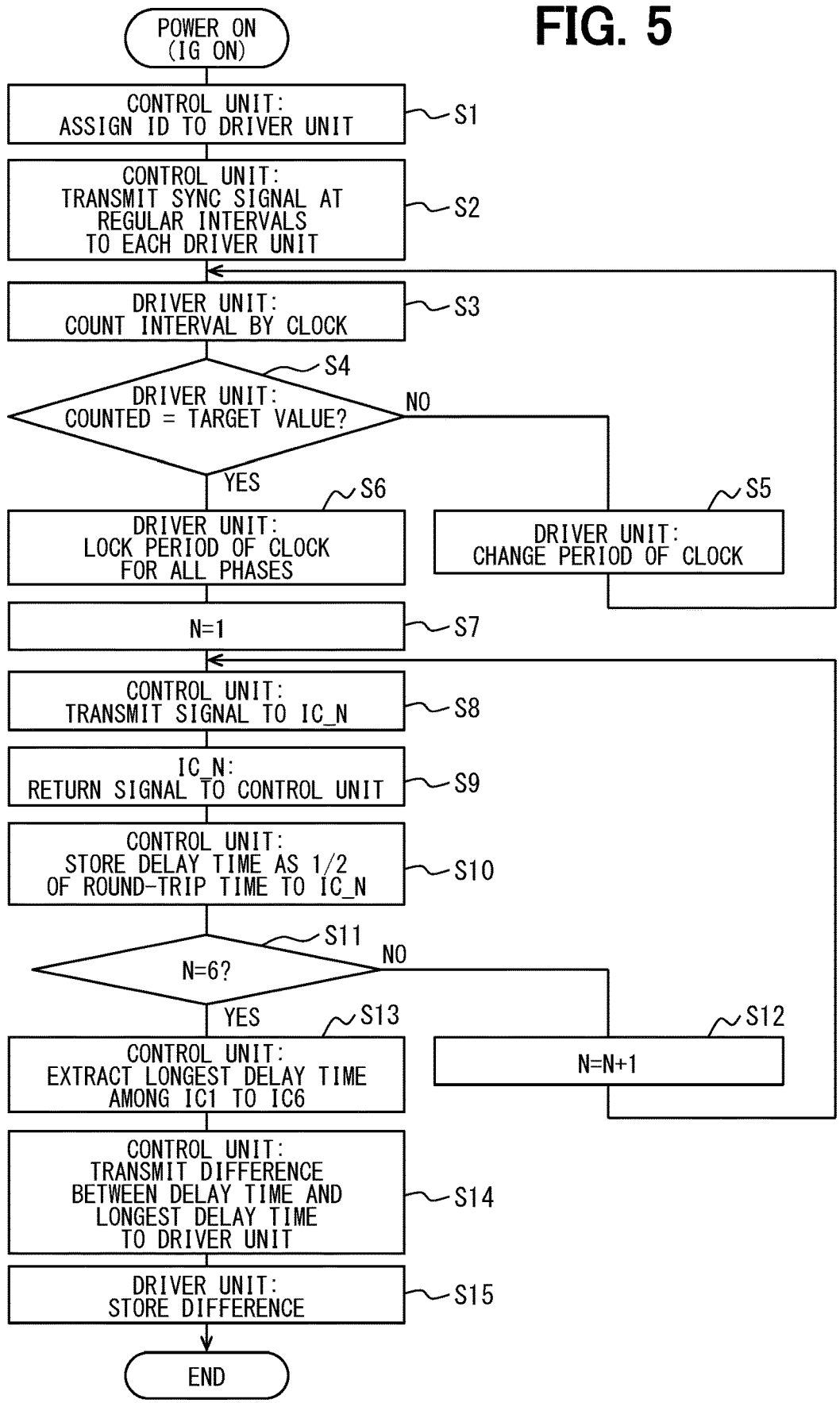

The following will describe an operation according to the present embodiment. As shown in FIG. 5, when the ignition switch (IG) of the vehicle is turned on and the power is turned on, the control unit 6 assigns an ID for identification to the insulated communication circuit 14 of each driver unit 11 (S1). For this purpose, for example, known techniques disclosed in JP2006-268254 A, JP2011-181392 A, WO2014/162765 A1, are used. The disclosures of JP2006-268254 A, JP2011-181392 A, and WO2014/162765 A1 are incorporated herein by reference.

Figure 7:
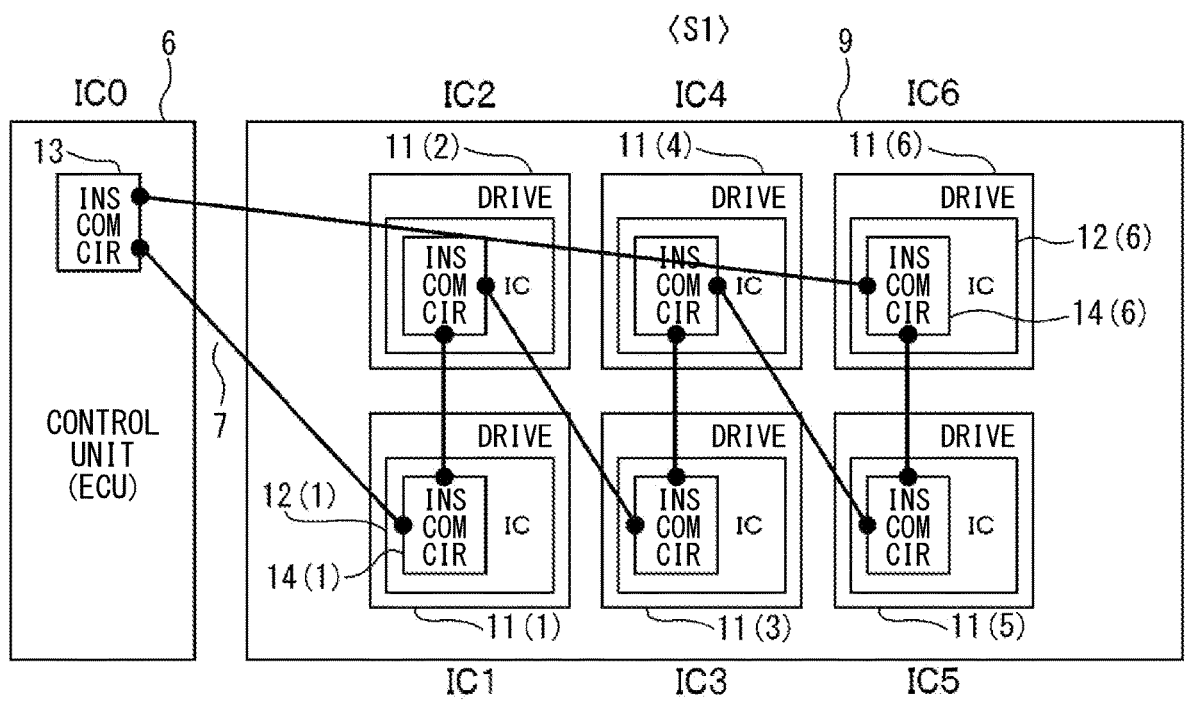
FIG. 7 is a diagram showing a process of assigning an ID to each IC.

For example, as shown in FIG. 7, the ID of the insulated communication circuit 13 is set to IC0, and the IDs of the insulated communication circuits 14 (1) to 14 (6) are set to IC1 to IC6, respectively, according to a communication connection order of the daisy chain. The ID data corresponds to an identification data. In the following, the control unit 6 and each driver unit 11 may be represented by IC0 to IC6, which are IDs of the insulated communication circuits 13, 14 (1) to 14 (6), respectively.

Figure 8:
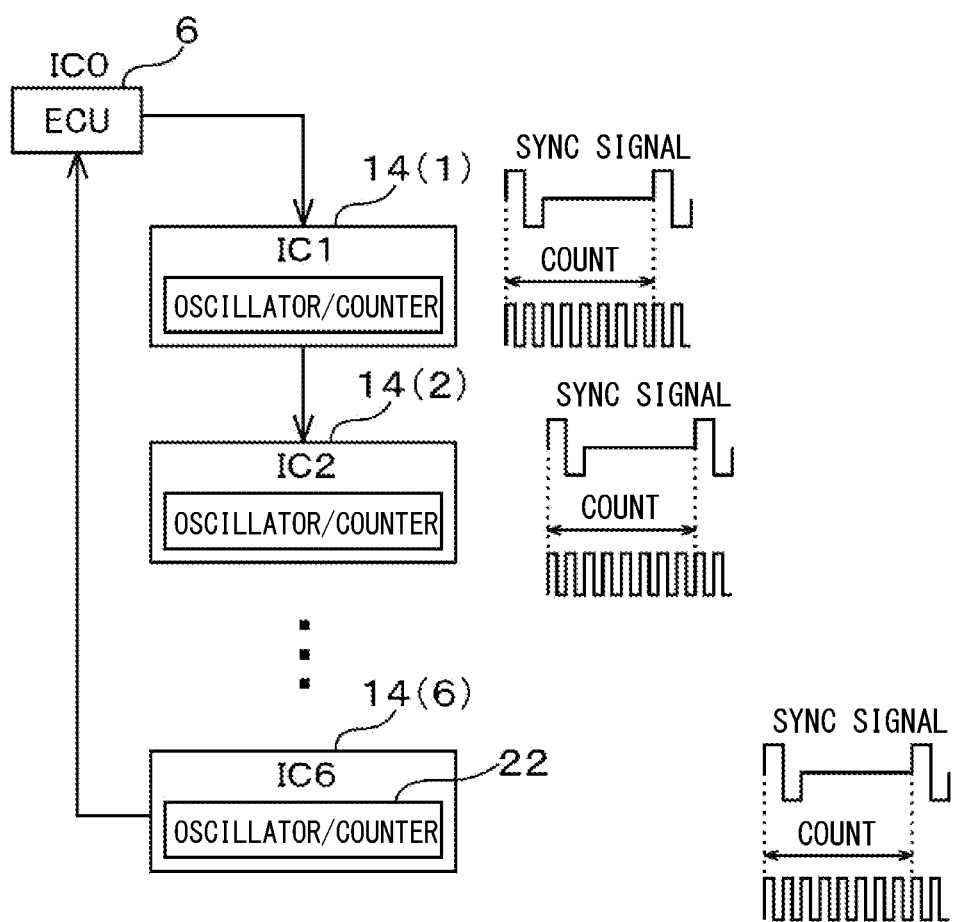
FIG. 8 is a diagram showing correction of a clock frequency performed by each IC.

Subsequently, the control unit 6 repeatedly transmits, as a synchronization signal, a pulse signal at regular time intervals via the IC0 to each driver unit 11 (S2). As shown in FIG. 8, IC1 to IC6 each use a counter to count, as a clock count value, the interval between the rising edges of the received synchronization signals with the clock signal output by an oscillator as an oscillating circuit (S3). The functions of the oscillator and the counter are provided by the gate array 22.

IC1 to IC6 each determine whether or not the clock count value is a predetermined target value (S4). If the clock count value does not match the target value (NO), the clock period of each oscillator is changed, and then the process returns to step S3 (S5). If the clock count value matches the target value (YES), the clock period of each oscillator is locked (S6).

Next, when the pointer N indicating the ID number of the IC is set to "1" (S7), the control unit 6 transmits a monopulse signal from IC0 to IC_N (S8). Upon receiving the monopulse signal, the IC_N returns the monopulse signal to the control unit 6 (S9). That is, in this case, the monopulse signal is transmitted not to the downstream side of the daisy chain but to the upstream side. In other words, any one of a plurality of driver units 11 as a plurality of slaves is configured to return, during steps S8 to S12 as a measurement period (to be described later), a response to the control unit 6 as a master backward to a direction from which the transmission from the master is received.

Figure 9:
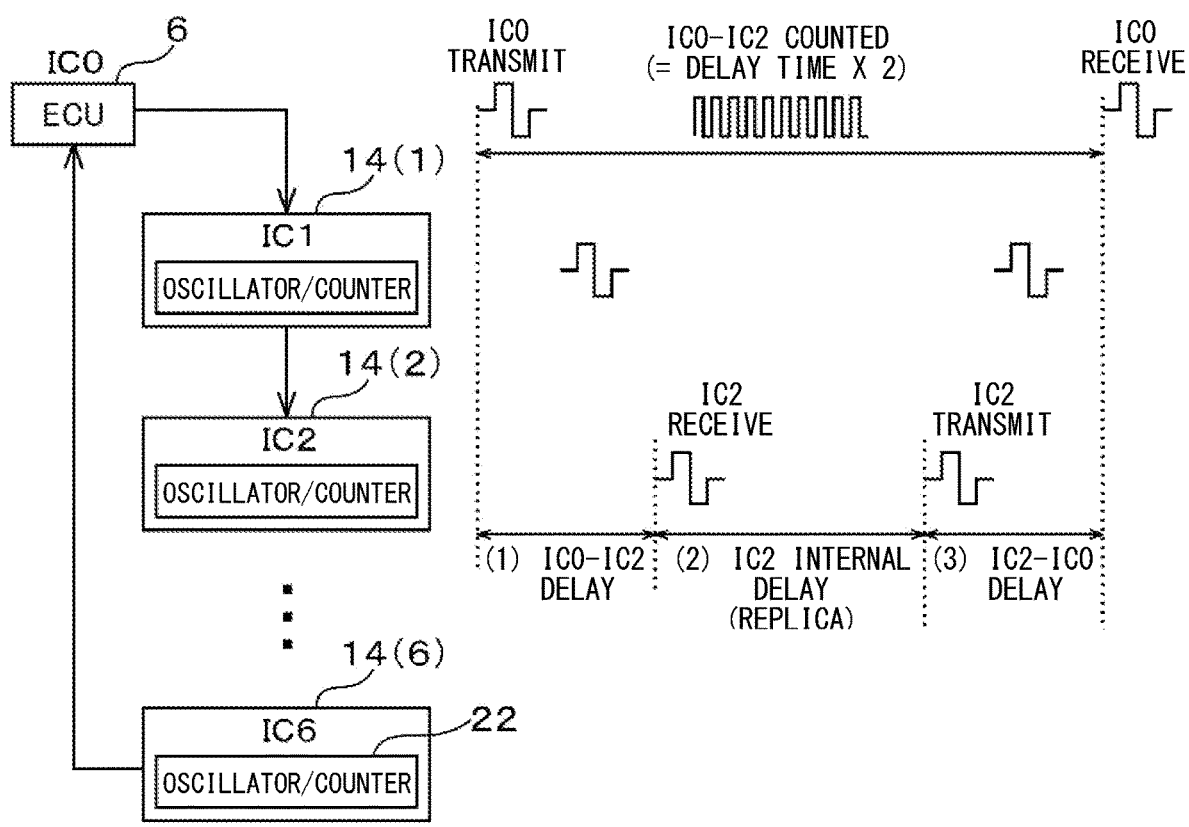
FIG. 9 is a diagram showing a measurement process of a communication delay time between ICs.

When the control unit 6 receives the monopulse signal returned by the IC_N, the control unit 6 measures a round-trip time from the time of transmission of the monopulse signal to the time of reception of the monopulse signal, halves the measured round-trip time to obtain a signal delay time, and store the obtained signal delay time (See S10, FIG. 9). Then, it is determined whether or not the pointer N is "6" (S11). When it is not "6" (NO), the pointer N is incremented (S12) and the process returns to step S8. The above steps S8 to S12 correspond to a measurement period.

When measuring the above delay time, a replica circuit up to the circuit that outputs a gate drive signal is prepared for each IC1 to IC6. Thereby, the delay time of the signal generated in the replica circuit may be added as an internal delay.

When the pointer N becomes "6" (YES), the control unit 6 extracts the longest time from the stored delay times of IC1 to IC6 (S13). Then, when the difference times between the respective delay times of IC1 to IC6 and the longest delay time are obtained, the obtained difference times are transmitted to the corresponding driver units 11 (S14). Each driver unit 11 stores the difference time corresponding to itself (S15). In the example shown in FIG. 10, the longest delay time is 25 μs of IC6, and the respectively corresponding difference times of IC1 to IC6 with respect to the longest delay time are shown as [15 μs, 12 μs, 9 μs, 6 μs, 3 μs, 0 μs].

Figure 6:
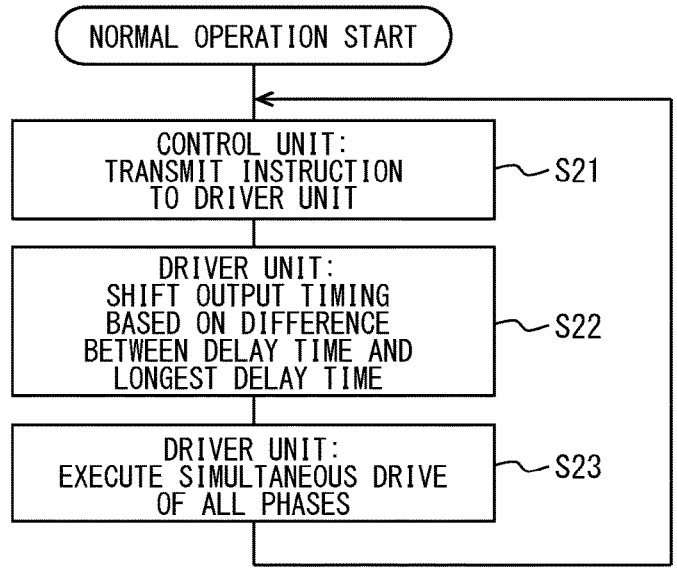
FIG. 6 is a flowchart showing a normal system operation.
Figure 11:
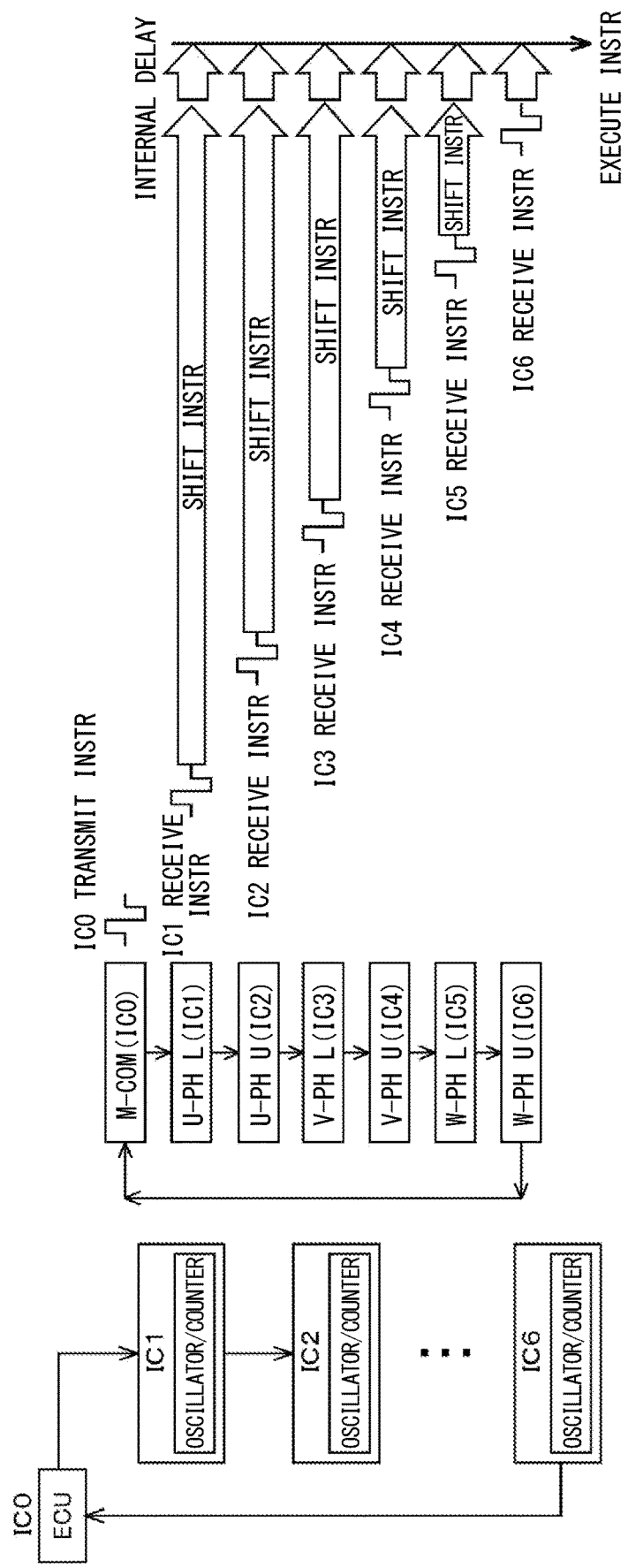
FIG. 11 is a diagram showing a process of synchronizing the timing of outputting a gate drive signal by performing a shift of an instruction for each IC.

Then, as shown in FIG. 6, in a normal operation of driving and controlling a motor, when the control unit 6 transmits a drive instruction to each driver unit 11 (S21), each driver unit 11 shifts the timing of outputting a gate drive signal by the corresponding difference time (i.e., by a shift time) (S22). As a result, each driver unit 11 drives all phases at the same timing, resulting in simultaneous drive of all phases (S23). FIG. 11 shows an image of simultaneous driving of all phases.

In this way, the output timings of the gate drive signals given to the respective FETs 10 constituting the main circuit 8 of the inverter 4 become simultaneous. This eliminates the need to provide a dead time to prevent a short circuit between the upper and lower arms.

As described above, according to the first embodiment, the control unit 6 and each driver unit 11 connected in a daisy chain are provided with insulated communication circuits 13 and 14, individually. The control unit 6 measures a communication delay time between the control unit 6 and each driver unit 11 from a response time responding to a transmission of a pulse signal to each driver unit 11 in a measurement period. Then, based on the respective communication delay times of the driver units 11, the control unit 6 transmits, to the driver units 11, the corresponding shift times for equalizing the timings of the signals output by the driver units 11. Then, when each driver unit 11 receives an instruction requiring an output of a signal from the control unit 6, the driver unit 11 outputs the signal when the shift time has elapsed.

The above configuration can provide effects as follows. When the wiring distance between the control unit 6 and each of a plurality of driver units 11 is significantly long, it is assumed that the timings at which the plurality of driver units 11 receive the signals transmitted by the control unit 6 varies respectively. In such an assumption, each driver unit 11 is configured to output a signal after the lapse of the shift time transmitted from the control unit 6. Thereby, each driver unit 11 can synchronize the output timing of the signal with the output timings of the other driver units 11.

In this case, when the control unit 6 starts up, the control unit 6 transmits a plurality of identification data for identifying the driver units 11 respectively, thereby assigning the driver units 11 with the corresponding identification data. With this configuration, each slave can be easily identified even if the number of slaves connected in the daisy chain differs depending on the system.

Then, each driver unit 11 outputs a drive signal to each of a plurality of FETs 10 constituting the main circuit 8 of the inverter 4. It is thus not necessary to set a dead time to prevent a short circuit between the upper and lower arms. This makes it possible to prevent a decrease in drive efficiency and a deterioration in controllability.

Further, each driver unit 11 is provided with an oscillating circuit whose clock frequency can be adjusted and a counter that counts with the clock signal output by an oscillating circuit as an oscillator. The control unit 6 transmits a synchronization signal to each driver unit 11. Each driver unit 11 counts, as a count value, the interval time at which the synchronization signal is output with a counter, and adjusts a clock frequency so that the count value becomes a predetermined value. As a result, each driver unit 11 can accurately measure each shift time when outputting the gate drive signal. Therefore, the output timings of the gate drive signals can be reliably synchronized.

Second Embodiment

Figure 12:
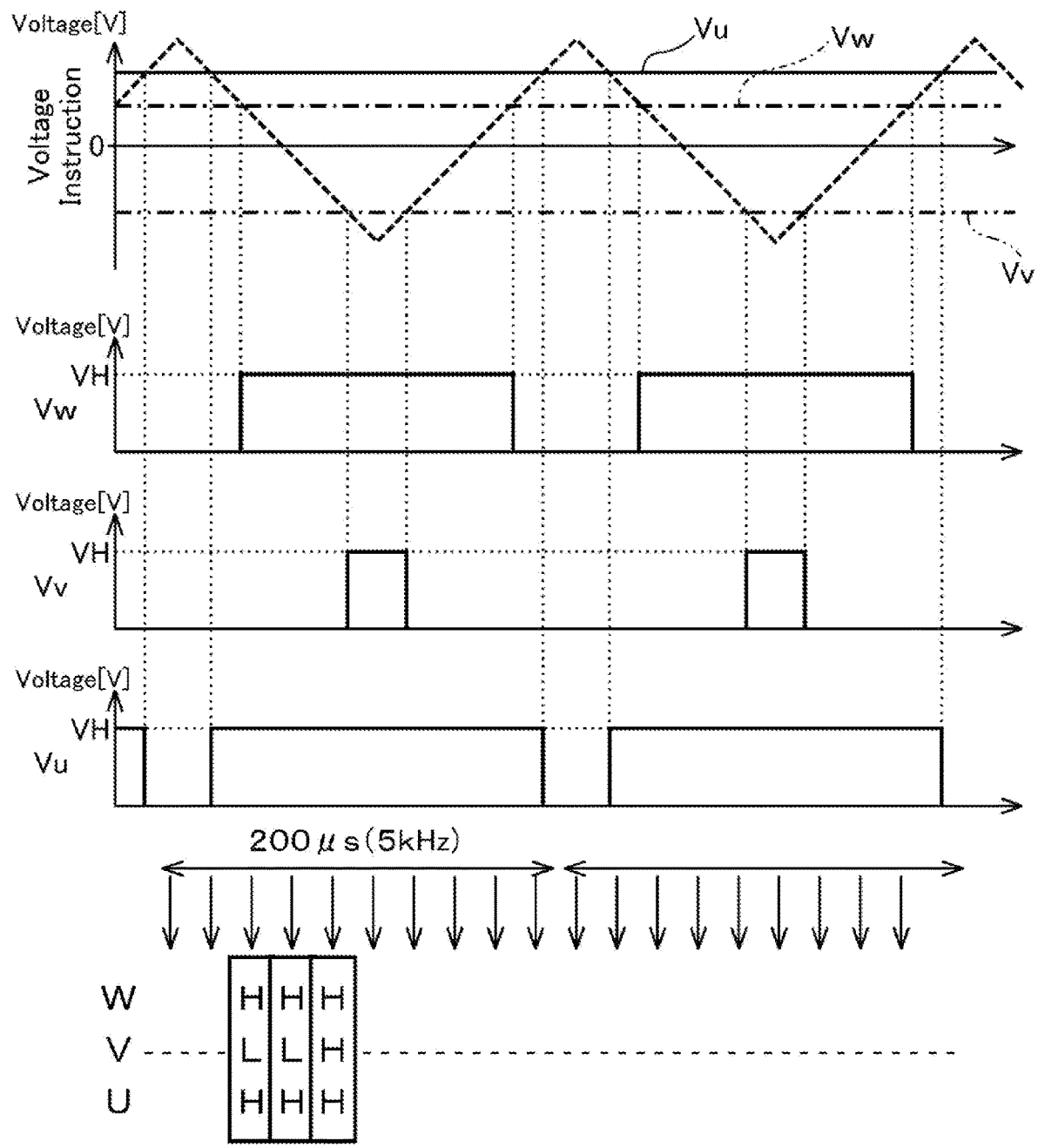
FIG. 12 is a diagram showing a specific example of a drive instruction transmitted by a control unit to each driver unit according to a second embodiment.
Figure 13:
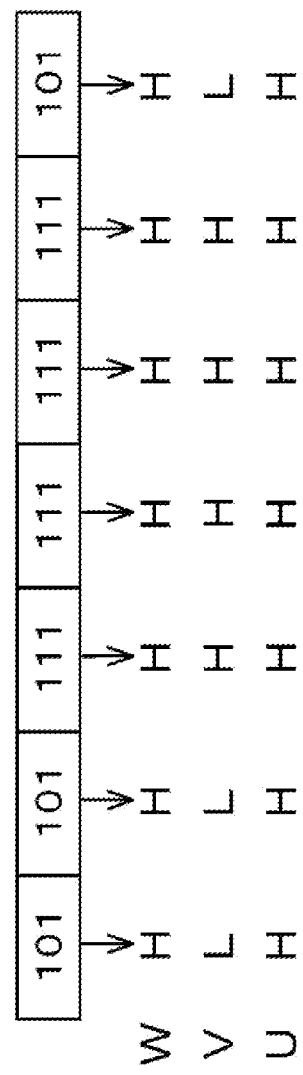
FIG. 13 is a diagram showing an example of drive instruction data to be transmitted.

Hereinafter, the identical parts as those in the first embodiment will be designated by the same reference signs for simplification of the description. Only differences from the first embodiment will be described below. A second embodiment shows a specific example of a drive instruction transmitted by the control unit 6 to each driver unit 11. As shown in FIG. 12 and FIG. 13, when the carrier frequency of PWM control is, for example, 5 kHz and the period is 200 µs, a drive instruction data is transmitted every 200 µs. In this case, if the drive instruction is not transmitted in the next control period, the driver unit 11 can determine that an abnormality of communication interruption has occurred and perform a protective operation such as shutdown.

Third Embodiment

Figure 14:
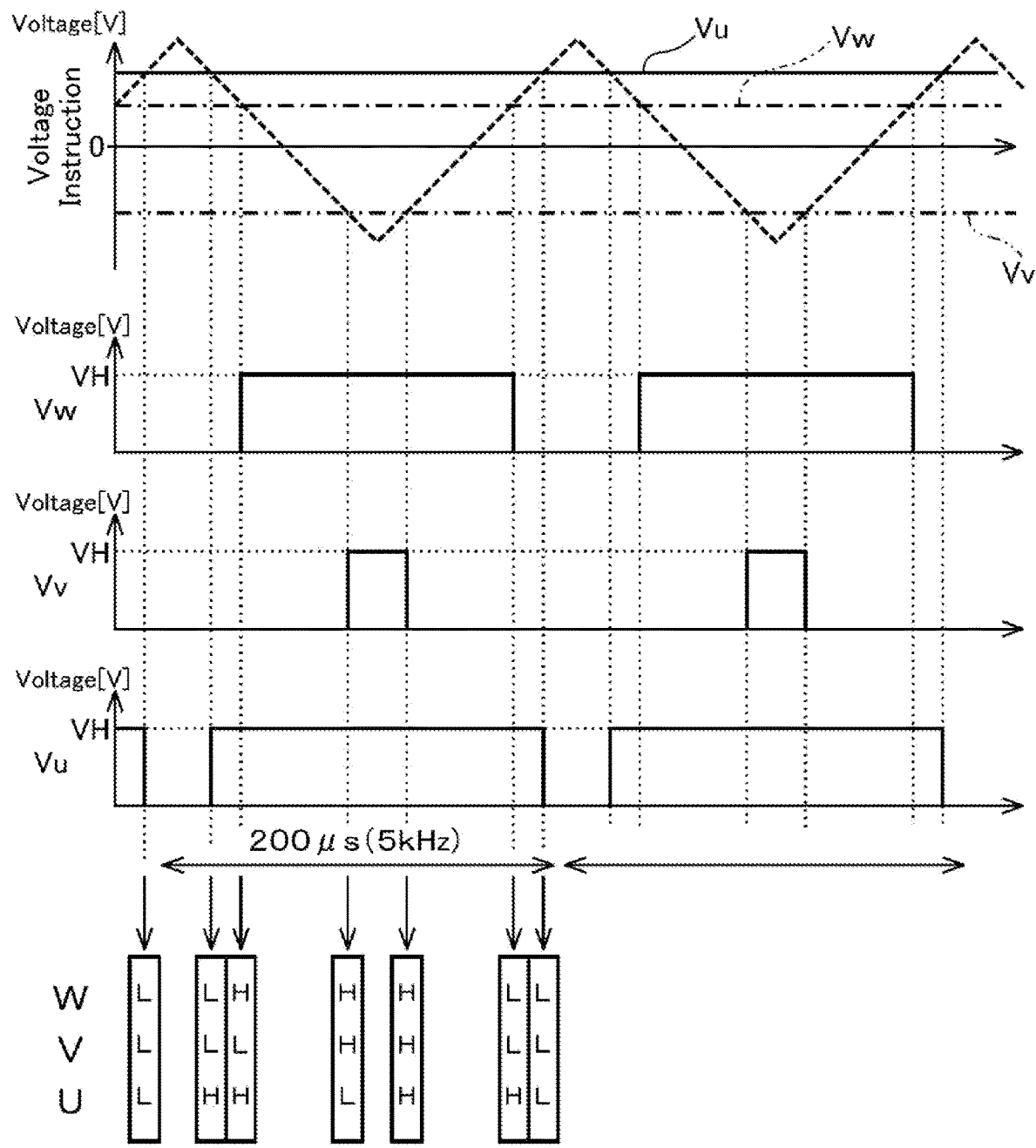
FIG. 14 is a diagram showing a specific example of a drive instruction transmitted by a control unit to each driver unit according to a third embodiment.
Figure 15:
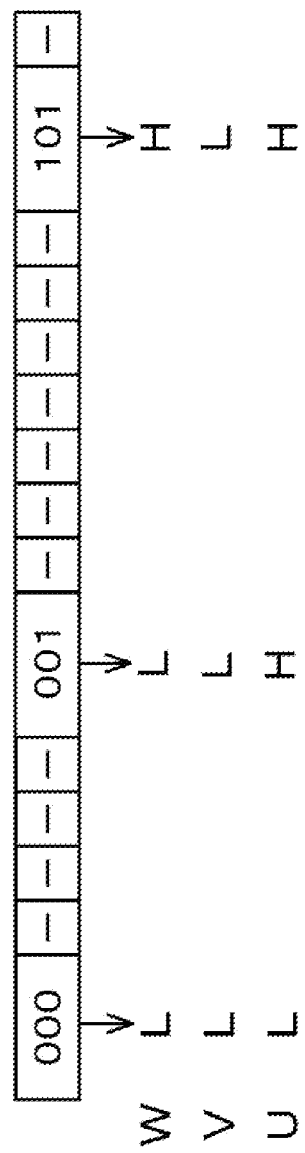
FIG. 15 is a diagram showing an example of data of a drive instruction to be transmitted.

A third embodiment will be described using a specific example of the transmission pattern of the drive instruction as in the second embodiment. In the third embodiment, as shown in FIG. 14 and FIG. 15, data is transmitted at the stage when the pattern of the three-phase drive instruction changes. In this case, the communication rate can be reduced as compared with the second embodiment.

Fourth Embodiment

In the first embodiment, the communication delay time shown in FIG. 10 may change depending on environmental conditions such as temperature. Therefore, in a fourth embodiment, the measurement of the delay time is periodically executed. When the ratio of change on a basis of the initially measured delay time exceeds a threshold value, a process of updating the difference time transmitted to each driver unit is performed.

Figure 16:
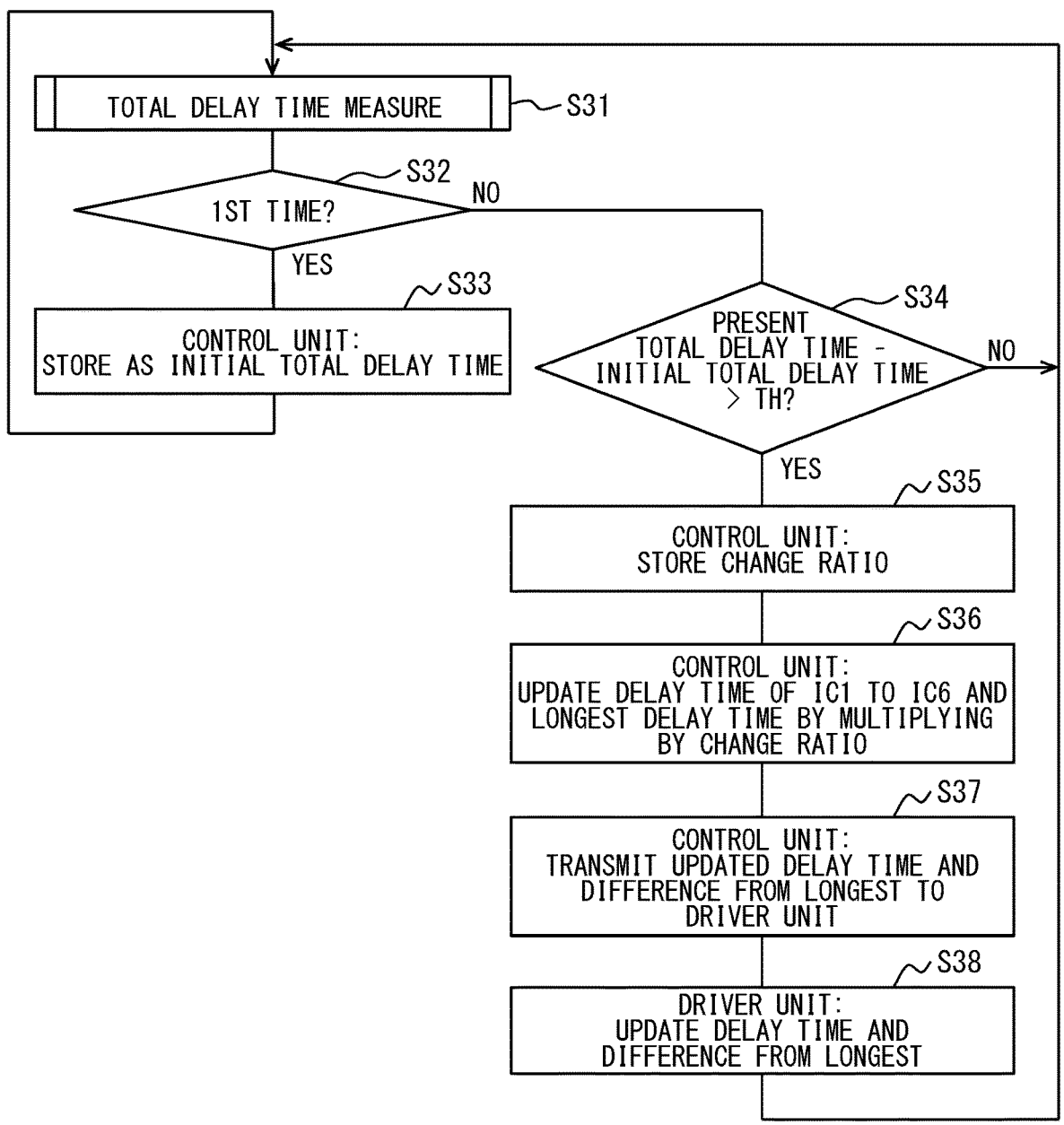
FIG. 16 is a flowchart showing a correction process for a total delay time according to a fourth embodiment.
Figure 17:
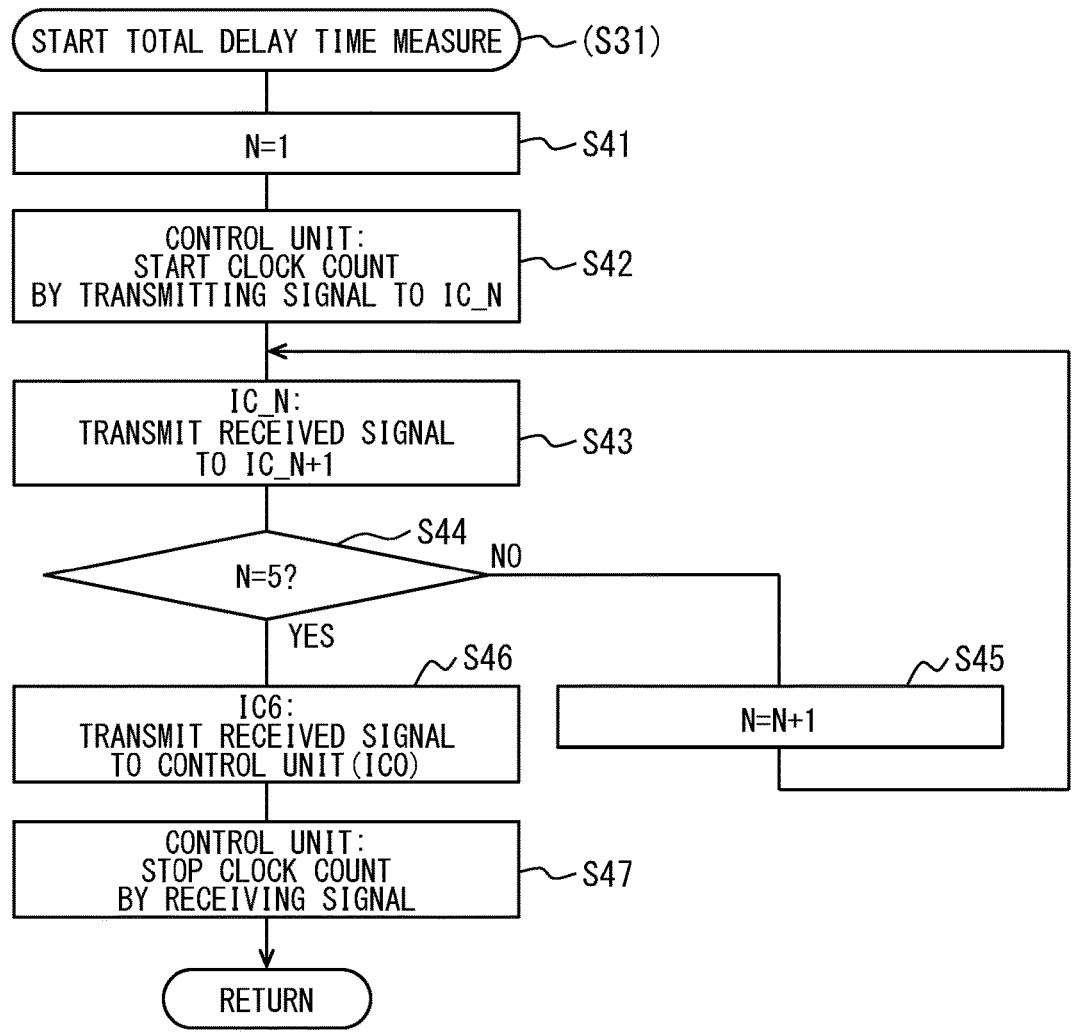
FIG. 17 is a flowchart showing a measurement process of a total delay time.

As shown in FIG. 16, in the loop of steps S31 to S33, the total delay time measurement process in step S31 is periodically executed. In the total delay time measurement process shown in FIG. 17, the control unit 6 transmits a pulse signal from IC0 to IC1 and starts time measurement, that is, clock counting (S41, S42). The IC_N that has received the pulse signal transfers the pulse signal to the IC_N+1 on the downstream side (S43). It should be noted that the control unit 6 is not involved in steps S43 to S46, and the processing performed on the IC1 to IC6 sides is shown. When "YES" is obtained in step S44, IC6 transmits the pulse signal received from IC5 to the control unit 6 (IC0) (S46). When the control unit 6 receives the pulse signal transmitted by IC6, the control unit 6 ends the time measurement (S47).

In FIG. 16, when returning from the total delay time measurement process, it is determined whether the measurement process is the first execution (S32). When it is determined that the measurement process is the first execution (S32: YES), the control unit 6 stores the measurement result as an initial value of the total delay time (i.e., initial measurement time) (S33). When it is carried out for the second time or later (S32: NO), the difference between the present measurement time and the initial measurement time is obtained, and it is determined whether or not the difference exceeds a threshold value (S34). As for the threshold value here, for example, if the initial measurement time is 50 µs, it may be set to 3 µs as a value less than 10% of the initial measurement time. If the difference between the two measurement times is equal to or less than the threshold value (NO), the process returns to step S31.

When the difference between the two measurement times exceeds the threshold value (YES), the control unit 6 obtains and stores the change ratio of the present measurement time with respect to the initial measurement time (S35). Then, each delay time is updated by multiplying the delay time of each IC1 to IC6 stored in step S10 by the above change ratio (S36).

Subsequently, similarly to step S14, the control unit 6 obtains the difference between the longest delay time and the other delay time based on the updated value, and transmits the difference to each driver unit 11 (S37). Each driver unit 11 stores the difference time corresponding to itself (S38). Then, the process returns to step S31.

For example, as shown in FIG. 18, when the total delay time is increased by 10% with respect to the value at start (i.e., initial time), the shift time corresponding to each driver unit 11 is updated according to the change ratio.

As described above, according to the fourth embodiment, the control unit 6 measures and monitors the total delay time from the time when the pulse signal is transmitted to the time when the pulse signal is received via the driver unit 11 (6) located at the end of the communication connection in the daisy chain. When the total delay time measured this time changes from the previously measured value, the shift time of each driver unit 11 is corrected according to the change ratio. In other words, the master is configured to measure and monitor a total delay time from a time of transmitting a signal to a slave of the plurality of slaves arranged first in the communication connection order in the daisy chain to a time of receiving a response from a slave of the plurality of slaves arranged last in the communication connection order in the daisy chain. Then, in response to the total delay time having undergone a change from a previously measured value, the master is configured to correct the shift time of each of the plurality of slaves according to a ratio of the change. As a result, even if the signal delay time changes due to changes in environmental conditions or the like, the shift time of each driver unit 11 can be appropriately corrected.

Fifth Embodiment

Figure 19:
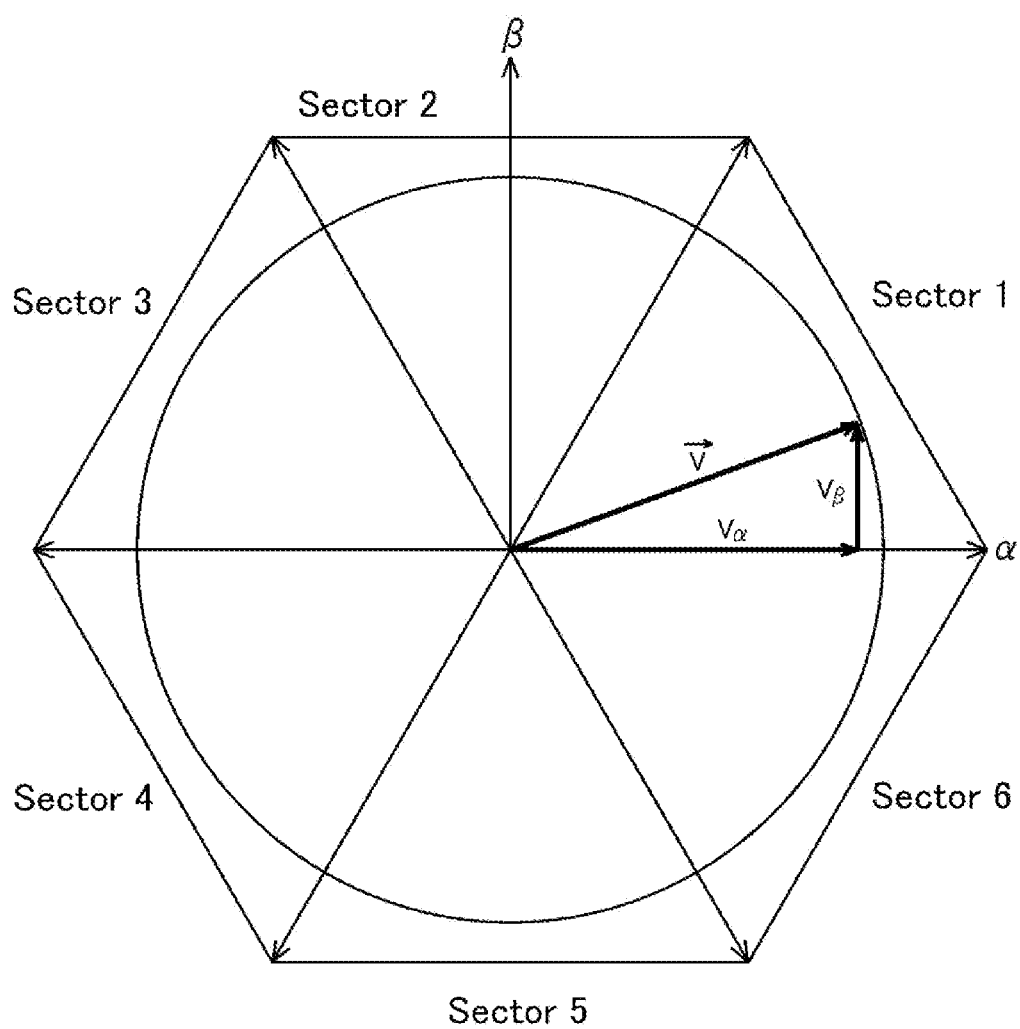
FIG. 19 is a diagram showing a space voltage vector according to a fifth embodiment.
Figure 20:
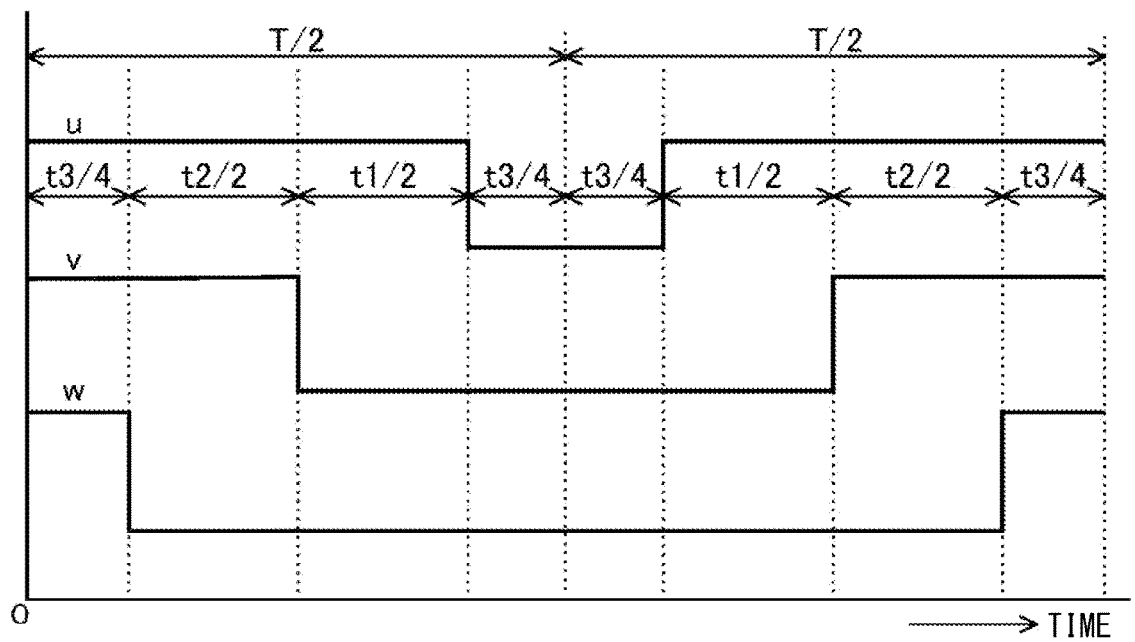
FIG. 20 is a diagram showing an example of a three-phase signal in one carrier period of sector.

In a fifth embodiment, the drive instruction transmitted by the control unit 6 to each driver unit 11 is generated according to a space vector method as shown in FIGS. 19 and 20. FIG. 20 is a three-phase drive signal pattern having a one-carrier period T in sector 1. In the half period, the voltage vector changes as [V0→V2→V1→V0], and the output time of each voltage vector changes as [t¾→t2/2→t½→t¾].

Figure 21:
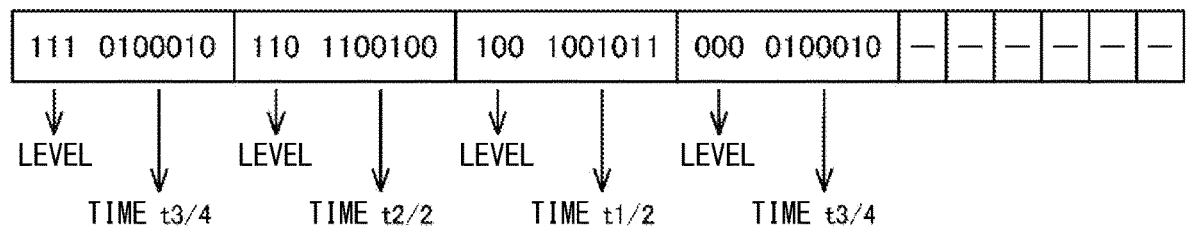
FIG. 21 is a diagram showing an example of data of a drive instruction corresponding to FIG. 20.

FIG. 21 is an example of drive instruction data transmitted by the control unit 6 to each driver unit 11 corresponding to FIG. 20. The first 3 bits indicate the voltage vector, and the following 7 bits indicate the output time of each voltage vector. Since the latter half of the period T is the return of the output pattern of the first half, only the data of the first half needs to be transmitted. The control unit 6 collectively transmits data in such a format at the beginning of each carrier period T. Each driver unit 11 grasps the binary level of the gate drive signal output by each according to the voltage vector indicated by the first 3 bits.

As described above, the fifth embodiment provides the effects as follows. The control unit 6 generates a drive instruction to be transmitted to each driver unit 11 by the space vector method. At the beginning of the carrier period T as a control period, the control unit 6 transmits the drive instruction with data including a level value of the drive signal and the duration of the level value in the period T. Each driver unit 11 outputs a gate drive signal to each FET 10 based on the received data. As a result, the communication rate can be further reduced. Further, each driver unit 11 can detect a communication interruption when data cannot be received at the beginning of the period T.

Sixth Embodiment

In a sixth embodiment, the space vector method is applied as in the fifth embodiment. Each driver unit 11 adds information to the free area of the data packet transmitted by the control unit 6 and forwards it to the control unit 6. The added information includes information sensed by a sensor or the like provided in each driver unit 11, such as information on the temperature, voltage, current, and short circuit of the FET 10.

Figure 22:
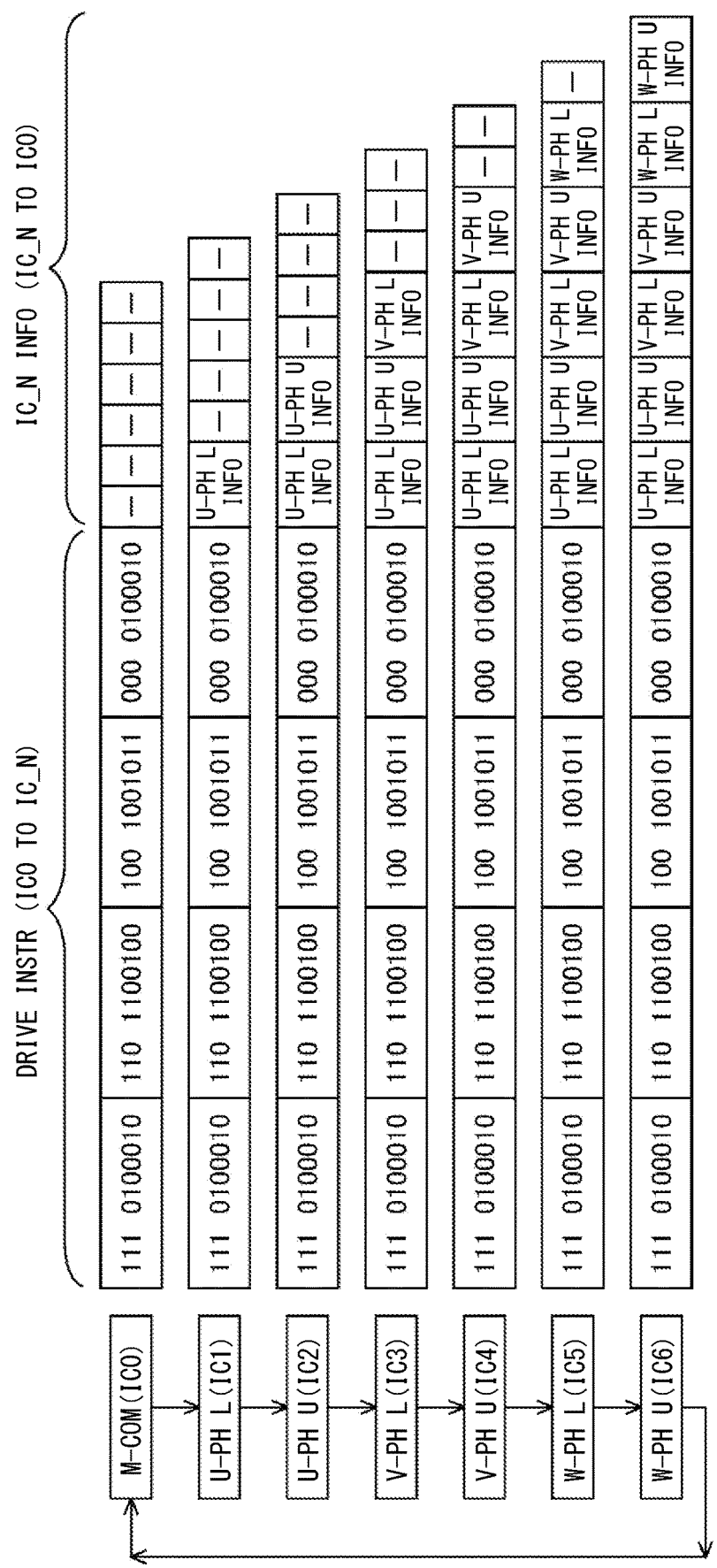
FIG. 22 is a diagram showing a process of adding information sensed by each driver unit to a free area of a data packet of a drive instruction according to a sixth embodiment.

As shown in FIG. 22, there is a free area in the drive instruction data packet transmitted by IC0. IC1 adds the information of the U-phase lower arm to the received data packet and transmits it to IC2. IC2 adds the information of the U-phase upper arm to the received data packet and transmits it to IC3. Similarly, IC3 to IC6 add the information of the V phase lower arm, the V phase upper arm, the W phase lower arm, and the W phase upper arm to the data packet, respectively. IC0 receives the data packet transmitted by IC6 and grasps the information of each driver unit 11.

As described above, the sixth embodiment provides effects as follows. When each driver unit 11 receives the drive instruction data packet, it adds various state data obtained by sensing to the data packet and then transmits the data packet to the IC (i.e., communication device) located or arranged next on the downstream side in the communication connection order in the daisy chain. As a result, the control unit 6 can grasp information about each driver unit 11.

Seventh Embodiment

Figure 23:
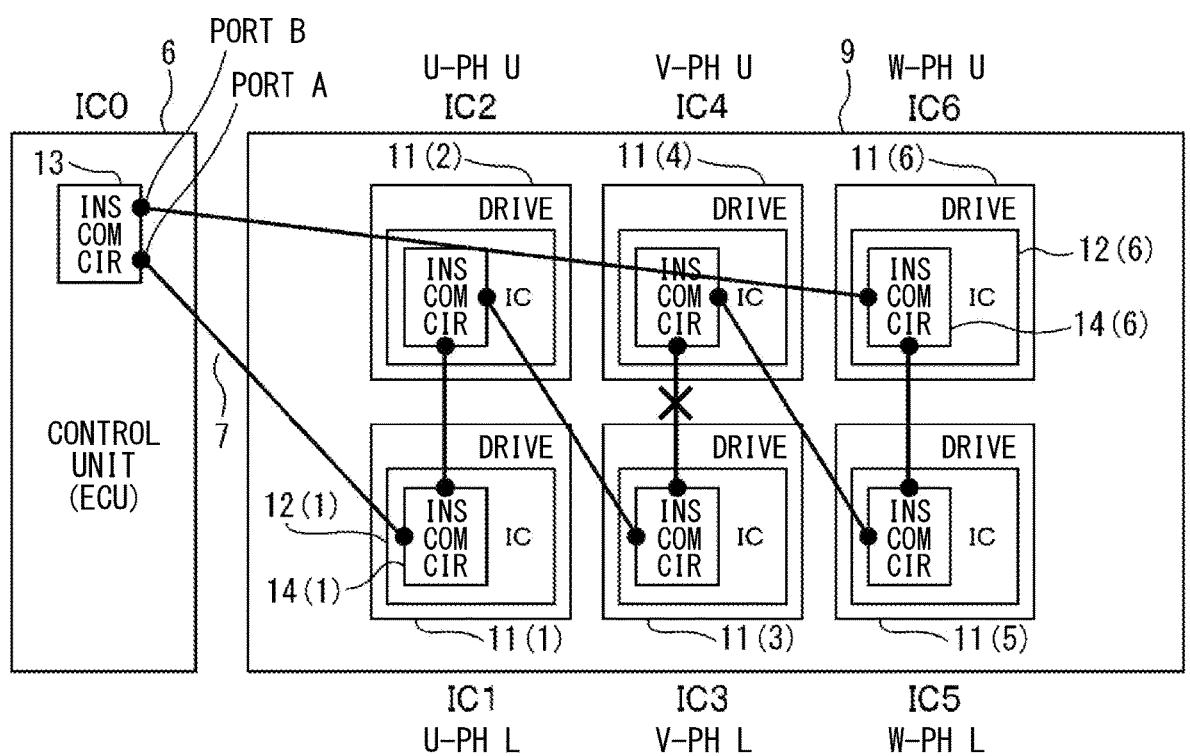
FIG. 23 is a diagram showing a state in which communication is interrupted according to a seventh embodiment.

In a seventh embodiment, for example, as shown in FIG. 23, when the control unit 6 detects that a communication interruption has occurred between the driver units 11 (3) and 11 (4), the control unit 6 stops the communication by the daisy chain. In the daisy chain communication, port A of the insulated communication circuit 13 is used as a transmitting side, and port B is used as a receiving side. Suppose a case where the control unit 6 stops the daisy chain communication as described above. In such a case, the control unit 6 switches to perform bidirectional communication with IC1 to IC3 using port A and bidirectional communication with IC6 to IC4 using port B.

Figure 24:
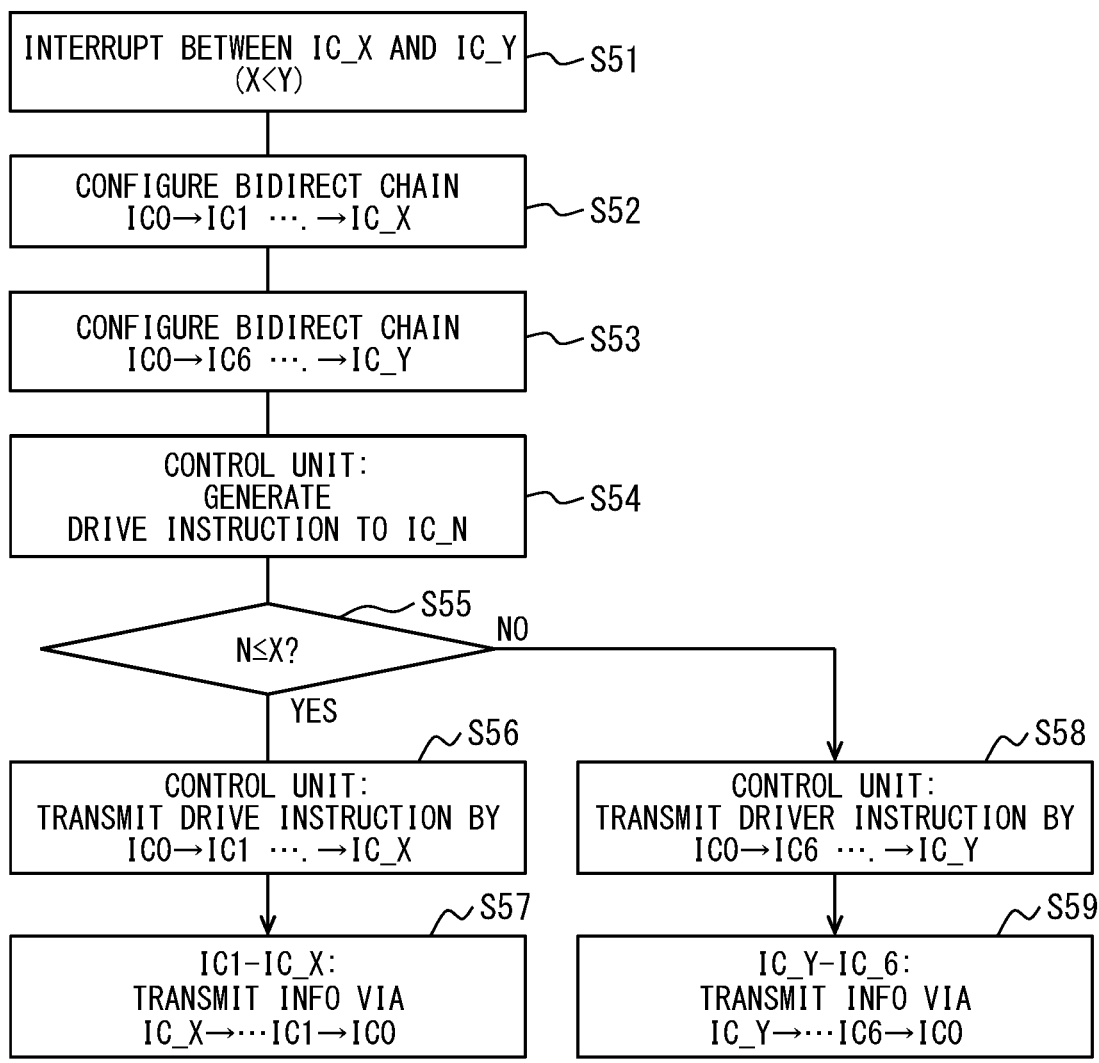
FIG. 24 is a flowchart showing a process performed by a control unit.

As shown in FIG. 24, the control unit 6 is assumed to detect that a communication interruption has occurred between IC_X and IC_Y (X<Y) (S51). For example, in the example shown in FIG. 23, the control unit 6 can grasp the occurrence between IC3 and IC4 by being notified of the occurrence of communication interruption from IC4 to IC6. In this case, X=3 and Y=4.

Next, the control unit 6 configures a communication chain so as to perform unidirectional communication on the IC0→IC1→ . . . →IC_X side (S52), and a communication chain so as to perform unidirectional communication on the IC0→IC6→ . . . →IC_Y side (S53). Then, the control unit 6 generates a drive instruction to IC_N (S54). When N is X or less (S55: YES), the control unit 6 transmits the drive instruction by the route of IC0→IC1→ . . . →IC_X side. (S56). Then, IC0 to IC_X return and transmit the information of each driver unit 11 by the route of IC_X→ . . . →IC1→IC0 (S57). On the other hand, if N is larger than X (S55: NO), the control unit 6 transmits a drive instruction by the route of IC0→IC6→ . . . →IC_Y side (S58). Then, IC_Y to IC6 return and transmit the information of each driver unit 11 by the route of IC6→ . . . →IC0 (S59).

As described above, the seventh embodiment provides the following. When the control unit 6 detects that a communication interruption has occurred at any of the connection paths between the driver units 11, it also constitutes a path for starting communication from the driver unit 11 (6) side located at the end of the daisy chain. In other words, in response to detecting a communication interruption in the daisy chain having occurred between any two slaves of the plurality of slaves arranged next to each other in the communication connection order in the daisy chain, the master is configured to create a communication path, wherein a slave of the plurality of slaves arranged last in the communication connection order from the master in the daisy chain is provided to be arranged first from the master in a communication connection order in the created communication path. As a result, the motor 3 can be driven even if an abnormality occurs, and the vehicle can be made to take an evacuation action.

Eighth Embodiment

Figure 25:
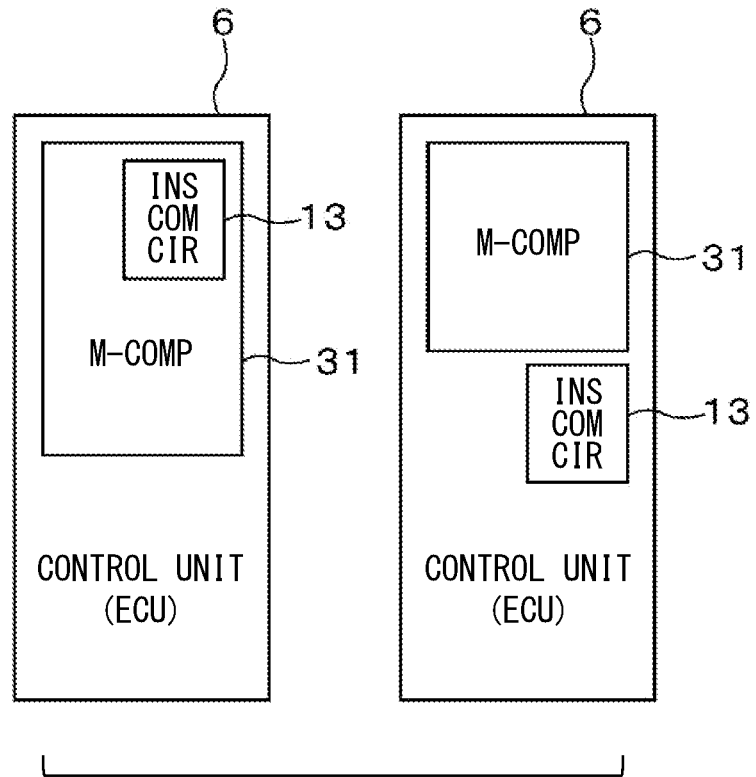
FIG. 25 is a diagram showing variations regarding an arrangement of an insulated communication circuit in a control unit according to an eighth embodiment.

An eighth embodiment is a variation relating to the arrangement of the insulated communication circuit 13 in the control unit 6. As shown in FIG. 25, the insulated communication circuit 13 may be integrated inside a microcomputer 31 constituting the control unit 6, or the insulated communication circuit 13 may be arranged outside the microcomputer 31.

Ninth Embodiment

Figure 26:
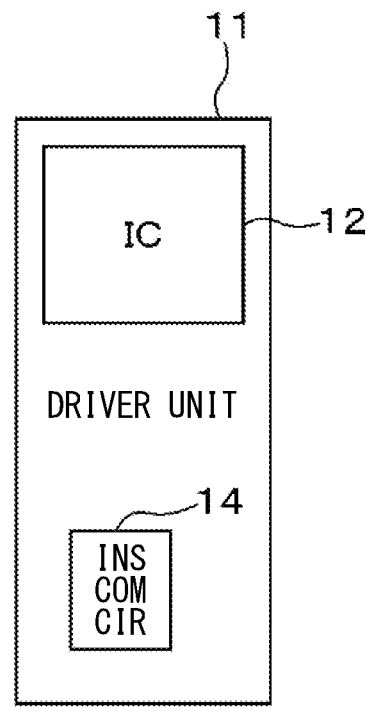
FIG. 26 is a diagram showing a variation regarding an arrangement of an insulated communication circuit in a driver unit according to a ninth embodiment.

A ninth embodiment is a variation relating to the arrangement of the insulated communication circuit 14 in the driver unit 11. As shown in FIG. 26, the insulated communication circuit 14 may be arranged outside the IC 12. The insulating communication circuit 14 may be built in a power card configured to be able to dissipate heat from both sides of the resin mold.

Tenth Embodiment

Figure 27:
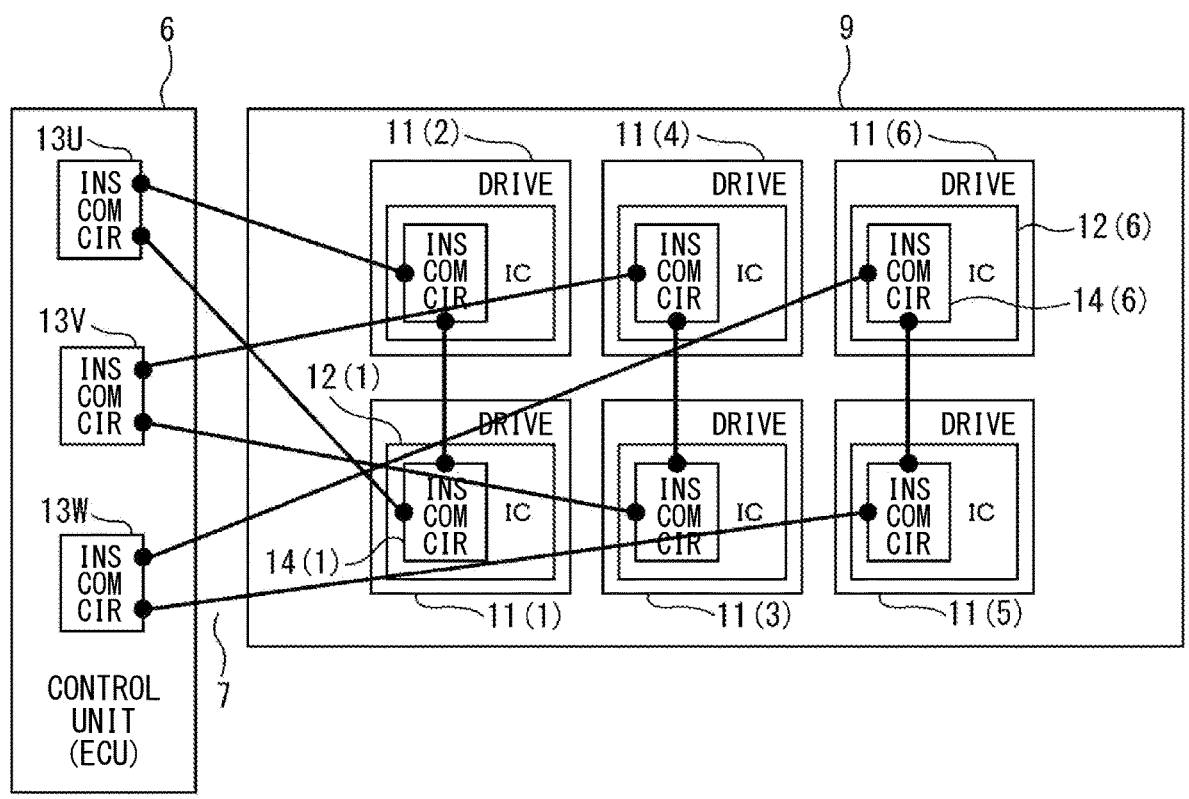
FIG. 27 is a diagram showing a configuration in which a control unit and a driver unit are daisy-chained for each phase according to a tenth embodiment.

In a tenth embodiment shown in FIG. 27, the control unit 6 includes three insulated communication circuits 13U, 13V, and 13W corresponding to the U, V, and W phases. The insulated communication circuit 13U is daisy-chained to the driver units 11 (1) and 11 (2). The insulated communication circuit 13V is daisy-chained to the driver units 11 (3) and 11 (4). The insulated communication circuit 13W is daisy-chained to the driver units 11 (5) and 11 (6).

Figure 28:
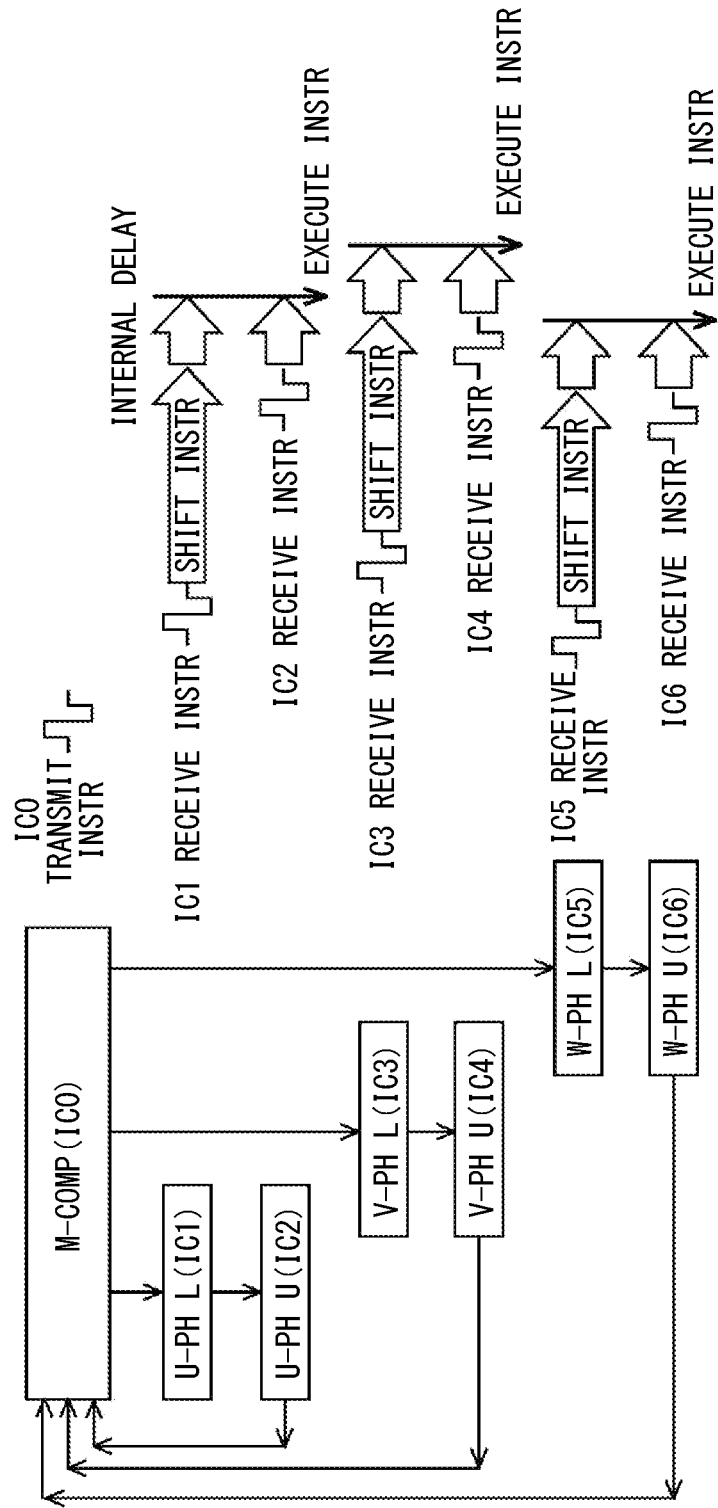
FIG. 28 is a diagram showing a process of synchronizing the timing of outputting a gate drive signal by performing a shift of an instruction for each IC.

In this case, as shown in FIG. 28, the control unit 6 outputs drive instructions to IC1, IC3, and IC5, respectively. The shift of the drive instruction is performed so that the output timings of the gate drive signals between the upper and lower arms of each of the U, V, and W phases are equal. With this configuration, the delay time of the communication signal can be shortened.

Eleventh Embodiment

Figure 29:
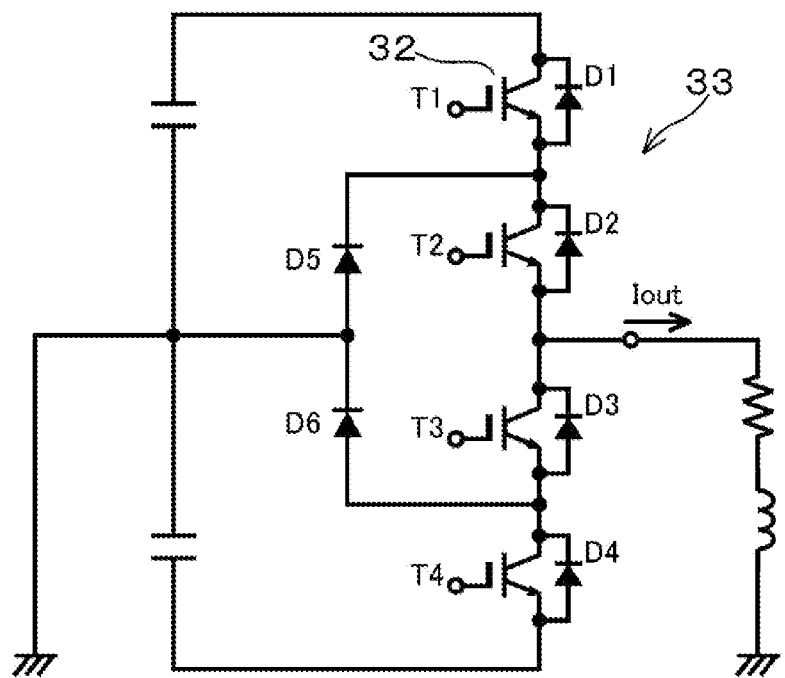
FIG. 29 is a diagram showing a three-level inverter according to an eleventh embodiment.
Figure 30:
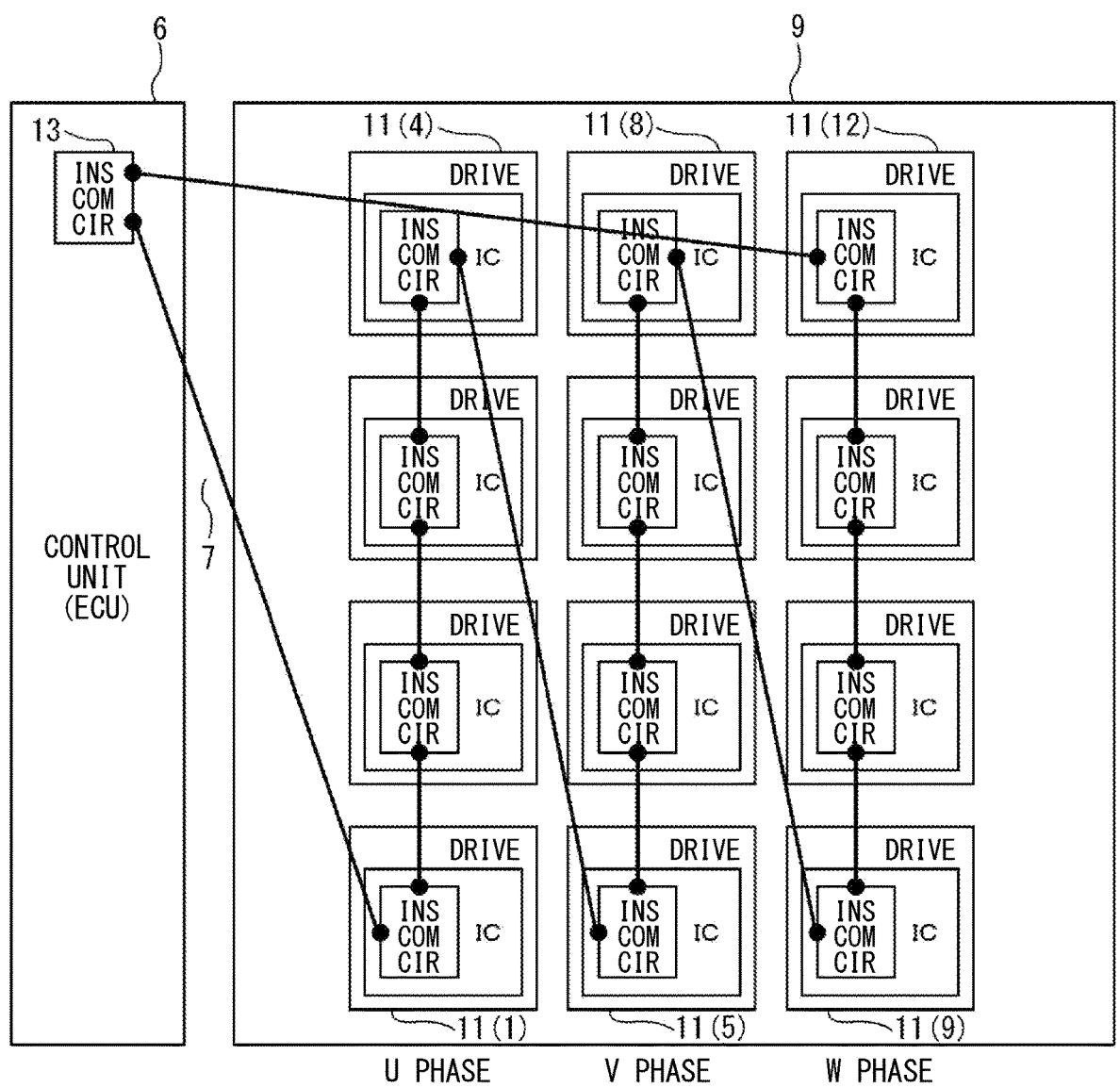
FIG. 30 is a diagram showing a configuration in which a control unit and driver units of three-level inverter are daisy-chained for each phase.

An eleventh embodiment shows a case where it is applied to a multi-level inverter. FIG. 29 is a main circuit 33 of a three-level inverter in which each arm is configured by connecting four IGBTs 32 in series. In this case, as shown in FIG. 30, the driver units 11 (1) to 11 (4) correspond to the U-phase arm; the driver units 11 (5) to 11 (8) correspond to the V-phase arm; and the driver units 11 (9) to 11 (12) correspond to the W phase arm. Then, the control unit 6 and the driver units 11 (1) to 11 (12) are daisy-chained.

Twelfth Embodiment

Figure 31:
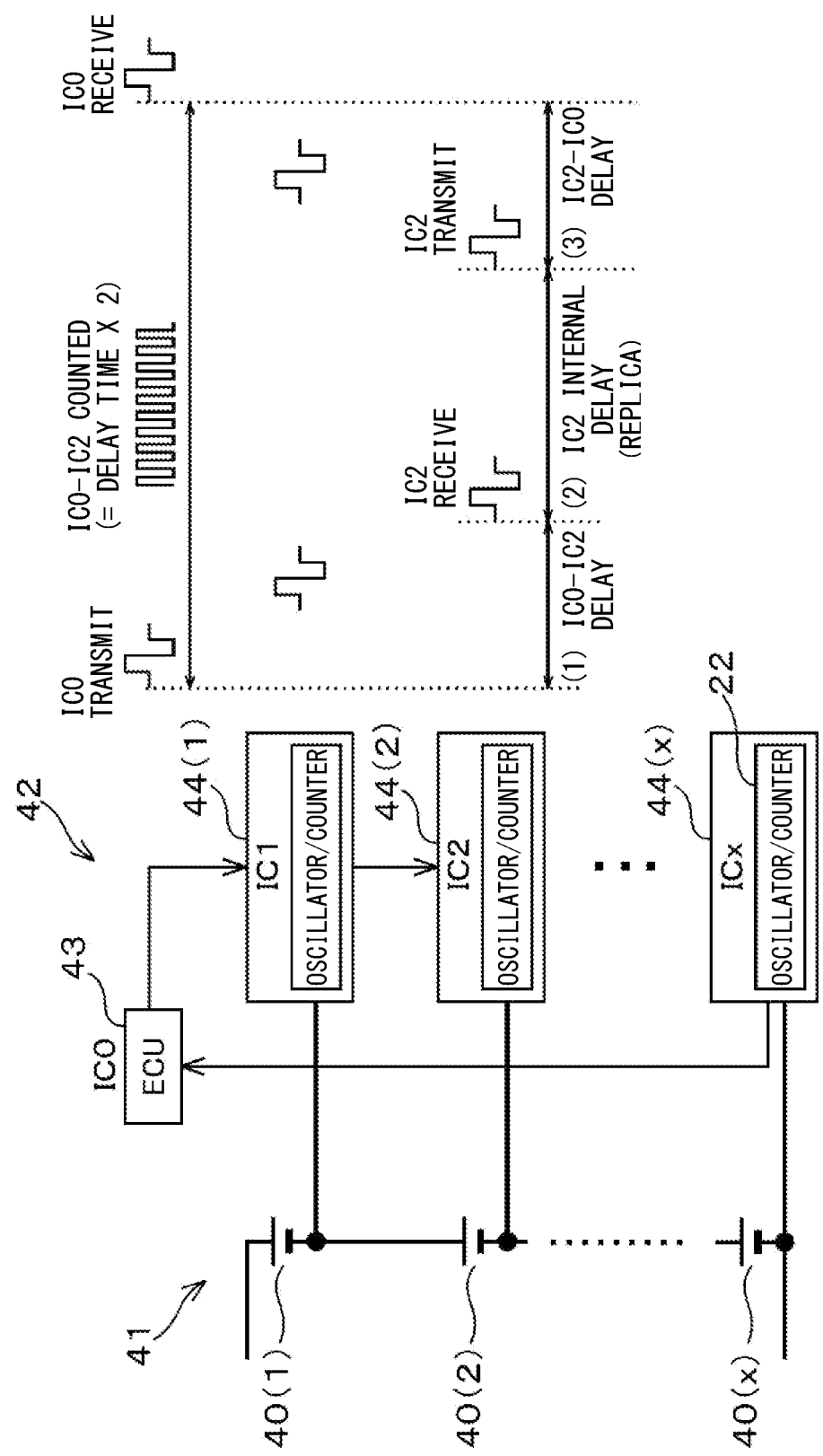
FIG. 31 is a diagram showing a case applied to a battery monitoring device connected to an assembled battery according to a twelfth embodiment.

A twelfth embodiment shown in FIG. 31 shows a case of the present disclosure applied to a battery monitoring device 42 connected to an assembled battery 41 in which x unit cells 40 are connected in series. The battery monitoring device 42 includes (i) a battery ECU 43 which serves as IC0 and (ii) battery ICs 44 (1) to 44 (x) which serve as IC1 to IC_x. The battery ICs 44 (1) to 44 (x) are connected to the corresponding unit cells 40 (1) to 40 (x), respectively. The battery ECU 43 and the battery ICs 44 (1) to 44 (x) are daisy-chained.

In the battery monitoring device 42 configured as described above, the battery ECU 43 measures each delay time as in the first embodiment, and transmits the shift time to each of the battery ICs 44 (1) to 44 (x). Then, each battery IC 44 (1) to 44 (x) synchronizes the timing of measuring the voltage of each unit cell 40 (1) to 40 (x) according to the respective shift time, for example. As described above, when applied to the battery monitoring device 42, the simultaneity of the data obtained by the measurement can be ensured for each unit cell 40 (1) to 40 (x).

Other Embodiments

The present disclosure may be applied by being not limited to the gate driver circuit of the inverter and the battery monitoring device. It may be applied to synchronize the processing timing of each slave in a system in which the master and a plurality of slaves are connected in a daisy chain for communication.

Furthermore, as described above, the control unit 6 is described as an ECU including an insulated communication circuit 14; the driver unit 11 is described as including an IC 12 that includes an insulated communication circuit 14. The method in the flowcharts by the control unit 6 may be provided by the function by the ECU; the method in the flowcharts by the driver unit 11 may be provided by the function by the IC. However, there is no need to be limited thereto. That is, each of the control unit 6 and the driver unit 11 may be implemented by one or more than one special-purpose computer including an insulated communication circuit.

Such computer may be created (i) by configuring (a) a memory and a processor programmed to execute one or more particular functions embodied in computer programs, or (ii) by configuring (b) a processor provided by one or more special purpose hardware logic circuits, or (iii) by configuring a combination of (a) a memory and a processor programmed to execute one or more particular functions embodied in computer programs and (b) a processor provided by one or more special purpose hardware logic circuits.

The computer programs may be stored, as instructions being executed by a computer, in a tangible non-transitory computer-readable storage medium.

Although the present disclosure has been described in accordance with embodiments, it is understood that the present disclosure is not limited to such embodiments or structures. The present disclosure incorporates various modifications and variations within the scope of equivalents. In addition, various combinations and configurations, as well as other combinations and configurations that include only one element, more, or less, are within the scope and spirit of the present disclosure.

For reference to further explain features of the present disclosure, the description is added as follows.

For example, there is proposed a first technology of a so-called in-wheel motor in which a motor, which is a drive source of a vehicle in an electric vehicle, is arranged on an inner peripheral side of a wheel included in a traveling wheel. Further, there is disclosed a second technology of a motor provided with an inverter which is a driver circuit corresponding to each motor in order to independently control the motor arranged on each wheel. Further, there is disclosed a third technology of an inverter having an in-wheel structure together with a motor corresponding to the inverter.

Here, assume an in-wheel structure as in the third technology where a motor and an inverter are provided in an inner peripheral side of a wheel. In such an in-wheel structure, an ECU (Electronic Control Unit) for controlling the inverter is needed to transmit a drive signal to each of a plurality of switching elements constituting the inverter arranged on each wheel. In that case, since the wiring distance from the ECU to each wheel becomes long, the difference in the delay time generated between the respective drive signals also becomes large.

In general, the drive signal given to each switching element is provided with a dead time for simultaneously turning off the switching elements of the upper and lower arms in order to prevent a short circuit between the upper and lower arms. In the inverter of the in-wheel structure, if the variation of the delay time generated between the drive signals increases, it is necessary to set the dead time longer accordingly.

However, if the dead time is set long, the loss generated by the motor will increase, torque fluctuations and cogging will occur in the low speed range, and gain will decrease at the current zero crossing point in vector control, leading to deterioration of motor controllability.

It is thus desired for the present disclosure to provide a communication system capable of minimizing the time difference of signals transmitted from a master to a plurality of slaves connected in a daisy chain.

Aspects of the present disclosure described herein are set forth in the following clauses.

According to a first aspect of the present disclosure, a communication system is provided with communication devices connected in a daisy chain. The communication devices include a mater and a plurality of slaves arranged first to last in a communication connection order from the master in the daisy chain. The master and the plurality of slaves include corresponding insulated communication circuits, respectively. The master is configured to measure, with respect to a first slave being any one of the plurality of slaves, a first communication delay time between the master and the first slave from a first response time responding to a transmission to the first slave during a measurement period. Then, the master is configured to (i) calculate a first shift time of the first slave based on the measured first communication delay time, the first shift time being calculated to permit a first timing of an output of a first signal by the first slave to be equal to a second timing of an output of a second signal by a second slave being any one of the plurality of slaves other than the first slave, and (ii) transmit the first shift time to the first slave. Then, in response to receiving, from the master, an instruction of the output of the first signal after receiving the first shift time, the first slave is configured to perform the output of the first signal at a time when the first shift time elapses since a time when receiving, from the master, the instruction of the output of the first signal.

The above configuration can provide effects as follows. When the wiring distance between the master and each of the slaves is long, it is assumed that the timings at which the slaves each receive an instruction requiring an output of a signal transmitted by the master vary from each other. In such an assumption, each slave is configured to output the signal required by the instruction after the lapse of the shift time transmitted from the master. Thereby, the slaves can synchronize the output timings of the signals.

According to a second aspect as an optional aspect of the first aspect, in the communication system, when the master is activated, the master transmits a plurality of identification data for identifying the slaves respectively, thereby assigning the slaves with the respective identification data. With this configuration, each slave can be easily identified even if the number of slaves connected in the daisy chain differs depending on the system.

According to a third aspect as an optional aspect of the first aspect, in the communication system, the plurality of slaves are configured to output corresponding drive signals, respectively, to corresponding switching elements included in a power conversion circuit configured to convert DC power into AC power. Therefore, for a power conversion circuit such as an inverter, the dead time set to prevent a short circuit between the upper and lower arms can be set as short as possible. This makes it possible to prevent a decrease in drive efficiency and a deterioration in controllability.

What is claimed is:

1. A communication system including communication devices communicating with each other in a daisy chain, the communication devices comprising:
   a master; and
   a plurality of slaves arranged first to last in a communication connection order from the master in the daisy chain,
   wherein:
   the master and the plurality of slaves include corresponding insulated communication circuits, respectively;
   the master is configured to
      (i) measure, with respect to a first slave being any one of the plurality of slaves, a first communication delay time between the master and the first slave from a first response time responding to a transmission to the first slave during a measurement period,
      (ii) calculate a first shift time of the first slave based on the measured first communication delay time, the first shift time being calculated to permit a first timing of an output of a first signal by the first slave to be equal to a second timing of an output of a second signal by a second slave being any one of the plurality of slaves other than the first slave, and
      (iii) transmit the first shift time to the first slave; and
   in response to receiving, from the master, an instruction of the output of the first signal after receiving the first shift time, the first slave is configured to perform the output of the first signal at a time when the first shift time elapses since a time when receiving, from the master, the instruction of the output of the first signal.

2. The communication system according to claim 1, wherein:
   in response to being activated, the master is configured to transmit a plurality of identification data to identify the plurality of slaves, respectively.

3. The communication system according to claim 1, wherein:
   the plurality of slaves are configured to output corresponding drive signals, respectively, to corresponding switching elements included in a power conversion circuit configured to convert DC power into AC power.

4. The communication system according to claim 3, wherein:
   the master is configured to
      generate, by a space vector method, drive instructions that are to be transmitted respectively to the plurality of slaves, and
      transmit, at a beginning of a control period of the space vector method, the drive instructions each of which includes a level value of the corresponding drive signal and a duration of the level value in the control period; and the first slave being any one of the plurality of slaves is configured to output a drive signal to the corresponding switching element based on the level value and the duration included in the received drive instruction.

5. The communication system according to claim 4, wherein:

in response to receiving the drive instruction, the first slave being any one of the plurality of slaves is configured to add state data obtained by sensing, to the drive instruction and then transmit the drive instruction to which the state data is added, to the communication device arranged next in the communication connection order in the daisy chain.

6. The communication system according to claim 1, wherein:

the first slave being any one of the plurality of slaves is configured to return, during the measurement period, a response to the master backward to a direction from which the transmission from the master is received.

7. The communication system according to claim 1, wherein:

the master is configured to transmit a synchronization signal to the first slave being any one of the plurality of slaves;

the first slave includes (i) an oscillating circuit whose clock frequency is enabled to be adjusted and (ii) a counter configured to count with a clock signal output by the oscillating circuit; and the first slave is configured to count, as a count value, an interval time at which the synchronization signal is output with the counter, and adjust a clock frequency so that the count value becomes a predetermined value.

8. The communication system according to claim 1, wherein:

the master is configured to measure and monitor a total delay time from a time of transmitting a signal to a third slave of the plurality of slaves arranged first in the communication connection order in the daisy chain to a time of receiving a response from a fourth slave of the plurality of slaves arranged last in the communication connection order in the daisy chain; and in response to the total delay time having undergone a change from a previously measured value, the master is configured to correct the first shift time of the first slave being any one of the plurality of slaves according to a ratio of the change.

9. The communication system according to claim 1, wherein:

in response to detecting a communication interruption in the daisy chain having occurred between any two slaves of the plurality of slaves arranged next to each other in the communication connection order in the daisy chain, the master is configured to create a communication path; and a third slave of the plurality of slaves arranged last in the communication connection order from the master in the daisy chain is provided to be arranged first from the master in a communication connection order in the created communication path.

* * * * *